(12) United States Patent
Fairley et al.

(10) Patent No.: US 12,024,197 B2
(45) Date of Patent: Jul. 2, 2024

(54) METHOD AND SYSTEM FOR DYNAMICALLY CURATING AUTONOMOUS VEHICLE POLICIES

(71) Applicant: May Mobility, Inc., Ann Arbor, MI (US)

(72) Inventors: Stuart Fairley, Ann Arbor, MI (US); Asheesh Ranjan, Ann Arbor, MI (US); Melinda Kothbauer, Ann Arbor, MI (US); Sajan Patel, Ann Arbor, MI (US); Tom Voorheis, Ann Arbor, MI (US); Jeff Sterniak, Ann Arbor, MI (US); Edwin B. Olson, Ann Arbor, MI (US)

(73) Assignee: May Mobility, Inc., Ann Arbor, MI (US)

( * ) Notice: Subject to any disclaimer, the term of this patent is extended or adjusted under 35 U.S.C. 154(b) by 0 days.

(21) Appl. No.: 18/086,430

(22) Filed: Dec. 21, 2022

(65) Prior Publication Data
US 2023/0129316 A1    Apr. 27, 2023

Related U.S. Application Data

(63) Continuation of application No. 17/746,422, filed on May 17, 2022, now Pat. No. 11,565,716, which is a
(Continued)

(51) Int. Cl.
*B60W 60/00* (2020.01)
*G06N 20/00* (2019.01)
*G06V 20/56* (2022.01)

(52) U.S. Cl.
CPC ......... *B60W 60/0011* (2020.02); *G06N 20/00* (2019.01); *G06V 20/56* (2022.01); *B60W 2420/403* (2013.01); *B60W 2420/408* (2024.01)

(58) Field of Classification Search
None
See application file for complete search history.

(56) References Cited

U.S. PATENT DOCUMENTS

| 5,544,282 A | 8/1996 | Chen et al. |
|---|---|---|
| 6,199,013 B1 | 3/2001 | Oshea |

(Continued)

FOREIGN PATENT DOCUMENTS

| JP | 2011100492 A | 5/2011 |
|---|---|---|
| JP | 2015083417 A | 4/2015 |

(Continued)

OTHER PUBLICATIONS

Galceran, Enric , et al., "Multipolicy Decision-Making for Autonomous Driving via Changepoint-based Behavior Prediction", Proceedings of Robotics: Science and Systems (RSS); Jul. 2015; <https://april.eecs.umich.edu/papers/details.php?name=galceran2015rss> (Year: 2015).

(Continued)

*Primary Examiner* — Tamara L Weber
(74) *Attorney, Agent, or Firm* — Jeffrey Schox; Caitlin Ploch

(57) ABSTRACT

A system for dynamic policy curation includes a computing system and interfaces with an autonomous agent. A method for dynamic policy curation includes collecting a set of inputs; processing the set of inputs; and determining a set of available policies based on processing the set of inputs. Additionally or alternatively, the method can include any or all of: selecting a policy; implementing a policy; and/or any other suitable processes.

20 Claims, 10 Drawing Sheets

Related U.S. Application Data continuation of application No. 17/738,462, filed on May 6, 2022, now Pat. No. 11,667,306, which is a continuation of application No. 17/365,538, filed on Jul. 1, 2021, now Pat. No. 11,352,023.

(60) Provisional application No. 63/046,842, filed on Jul. 1, 2020.

(56) References Cited

U.S. PATENT DOCUMENTS

| | | |
|---|---|---|
| 8,949,016 B1 | 2/2015 | Ferguson et al. |
| 9,129,519 B2 | 9/2015 | Aoude et al. |
| 9,274,525 B1 | 3/2016 | Ferguson et al. |
| 9,368,026 B1 | 6/2016 | Herbach et al. |
| 9,495,874 B1 | 11/2016 | Zhu et al. |
| 9,507,346 B1 | 11/2016 | Levinson et al. |
| 9,618,938 B2 | 4/2017 | Olson et al. |
| 9,646,428 B1 | 5/2017 | Konrardy et al. |
| 9,720,412 B1 | 8/2017 | Zhu et al. |
| 9,811,760 B2 | 11/2017 | Richardson et al. |
| 9,914,452 B1 | 3/2018 | Ferguson et al. |
| 10,012,981 B2 | 7/2018 | Gariepy et al. |
| 10,062,294 B2 | 8/2018 | Kunzi et al. |
| 10,156,848 B1 | 12/2018 | Konrardy et al. |
| 10,235,882 B1 | 3/2019 | Aoude et al. |
| 10,248,120 B1 | 4/2019 | Siegel et al. |
| 10,386,856 B2 | 8/2019 | Wood et al. |
| 10,467,891 B1 | 11/2019 | Bart et al. |
| 10,518,770 B2 | 12/2019 | Kroop et al. |
| 10,518,783 B2 | 12/2019 | Tanimichi et al. |
| 10,540,892 B1 | 1/2020 | Fields et al. |
| 10,558,224 B1 | 2/2020 | Lin et al. |
| 10,564,641 B2 | 2/2020 | Vozar et al. |
| 10,564,643 B2 | 2/2020 | Lui et al. |
| 10,571,916 B2 | 2/2020 | Tschanz et al. |
| 10,586,254 B2 | 3/2020 | Singhal |
| 10,599,155 B1 | 3/2020 | Konrardy et al. |
| 10,614,709 B2 | 4/2020 | Vozar et al. |
| 10,642,276 B2 | 5/2020 | Huai |
| 10,654,476 B2 | 5/2020 | Wray et al. |
| 10,671,076 B1 | 6/2020 | Kobilarov et al. |
| 10,717,445 B2 | 7/2020 | Michalakis et al. |
| 10,761,542 B1 | 9/2020 | Fairfield et al. |
| 10,796,581 B2 | 10/2020 | Herbach et al. |
| 10,860,019 B2 | 12/2020 | Censi et al. |
| 10,969,470 B2 | 4/2021 | Voorheis et al. |
| 11,003,916 B2 | 5/2021 | Hummelshøj |
| 11,086,318 B1 | 8/2021 | Davis et al. |
| 11,087,200 B2 | 8/2021 | Olson et al. |
| 11,192,545 B1 | 12/2021 | Russell et al. |
| 11,215,982 B2 | 1/2022 | Urano et al. |
| 11,242,054 B2 | 2/2022 | Isele |
| 11,260,855 B2 | 3/2022 | Zhang |
| 11,269,332 B2 | 3/2022 | Vozar et al. |
| 11,281,213 B2 | 3/2022 | Cross et al. |
| 11,300,957 B2 | 4/2022 | Wray et al. |
| 11,352,023 B2 | 6/2022 | Fairley et al. |
| 11,380,108 B1 | 7/2022 | Cai et al. |
| 11,396,302 B2 | 7/2022 | Ye et al. |
| 11,472,436 B1 | 10/2022 | Patel et al. |
| 11,472,444 B2 | 10/2022 | Goeddel et al. |
| 11,496,707 B1 | 11/2022 | Crego et al. |
| 11,554,793 B2 | 1/2023 | Han et al. |
| 11,565,717 B2 | 1/2023 | Kothbauer et al. |
| 11,748,085 B2 | 9/2023 | Fields et al. |
| 11,780,466 B1 | 10/2023 | Shah |
| 11,858,536 B1 | 1/2024 | Liu et al. |
| 11,869,092 B2 | 1/2024 | Konrardy et al. |
| 2002/0062207 A1 | 5/2002 | Faghri |
| 2004/0100563 A1 | 5/2004 | Sablak et al. |
| 2005/0004723 A1 | 1/2005 | Duggan et al. |
| 2006/0184275 A1 | 8/2006 | Hosokawa et al. |
| 2006/0200333 A1 | 9/2006 | Dalal et al. |
| 2007/0193798 A1 | 8/2007 | Allard et al. |
| 2007/0276600 A1 | 11/2007 | King et al. |
| 2008/0033684 A1 | 2/2008 | Vian et al. |
| 2010/0114554 A1 | 5/2010 | Misra |
| 2010/0204867 A1 | 8/2010 | Longstaff |
| 2010/0228419 A1 | 9/2010 | Lee et al. |
| 2011/0142283 A1 | 6/2011 | Huang et al. |
| 2012/0089275 A1 | 4/2012 | Yao-Chang et al. |
| 2013/0054106 A1 | 2/2013 | Schmuedderich et al. |
| 2013/0141576 A1 | 6/2013 | Lord et al. |
| 2013/0253816 A1 | 9/2013 | Caminiti et al. |
| 2014/0195138 A1 | 7/2014 | Stelzig et al. |
| 2014/0244198 A1 | 8/2014 | Mayer |
| 2014/0277835 A1 | 9/2014 | Filev et al. |
| 2014/0309815 A1 | 10/2014 | Ricci et al. |
| 2015/0105961 A1 | 4/2015 | Callow |
| 2015/0284010 A1 | 10/2015 | Beardsley et al. |
| 2015/0302756 A1 | 10/2015 | Guehring et al. |
| 2015/0316928 A1 | 11/2015 | Guehring et al. |
| 2015/0321337 A1 | 11/2015 | Stephens |
| 2015/0344030 A1 | 12/2015 | Damerow et al. |
| 2016/0005333 A1 | 1/2016 | Naouri |
| 2016/0209840 A1 | 7/2016 | Kim |
| 2016/0314224 A1 | 10/2016 | Wei et al. |
| 2016/0334230 A1 | 11/2016 | Ross et al. |
| 2017/0031361 A1 | 2/2017 | Olson et al. |
| 2017/0032671 A1 | 2/2017 | Toyama et al. |
| 2017/0072853 A1 | 3/2017 | Matsuoka et al. |
| 2017/0123419 A1* | 5/2017 | Levinson ............ H04L 41/0816 |
| 2017/0155696 A1 | 6/2017 | Dong et al. |
| 2017/0192426 A1 | 7/2017 | Rust |
| 2017/0199523 A1 | 7/2017 | Barton-Sweeney et al. |
| 2017/0268896 A1 | 9/2017 | Bai et al. |
| 2017/0289341 A1 | 10/2017 | Rodriguez et al. |
| 2017/0291560 A1 | 10/2017 | Schroeder et al. |
| 2017/0291602 A1 | 10/2017 | Newman et al. |
| 2017/0301111 A1 | 10/2017 | Zhao et al. |
| 2017/0320500 A1 | 11/2017 | Yoo et al. |
| 2017/0323568 A1 | 11/2017 | Inoue et al. |
| 2017/0356748 A1 | 12/2017 | Iagnemma |
| 2018/0011485 A1 | 1/2018 | Ferren |
| 2018/0046182 A1 | 2/2018 | Joyce et al. |
| 2018/0047291 A1 | 2/2018 | Konishi et al. |
| 2018/0053102 A1 | 2/2018 | Martinson et al. |
| 2018/0065625 A1 | 3/2018 | Tijerina et al. |
| 2018/0070056 A1 | 3/2018 | Deangelis et al. |
| 2018/0082596 A1 | 3/2018 | Whitlow |
| 2018/0089563 A1 | 3/2018 | Redding et al. |
| 2018/0100743 A1 | 4/2018 | Diaz et al. |
| 2018/0183873 A1 | 6/2018 | Wang et al. |
| 2018/0184352 A1 | 6/2018 | Lopes et al. |
| 2018/0196427 A1 | 7/2018 | Majumdar et al. |
| 2018/0220283 A1 | 8/2018 | Condeixa et al. |
| 2018/0224851 A1 | 8/2018 | Park |
| 2018/0251126 A1 | 9/2018 | Inscott et al. |
| 2018/0267550 A1 | 9/2018 | Kopetz et al. |
| 2018/0268281 A1 | 9/2018 | Olson et al. |
| 2018/0293537 A1 | 10/2018 | Kwok |
| 2018/0299898 A1 | 10/2018 | Luo et al. |
| 2018/0330481 A1 | 11/2018 | Watanabe et al. |
| 2018/0365908 A1 | 12/2018 | Liu et al. |
| 2018/0367997 A1 | 12/2018 | Shaw et al. |
| 2019/0025819 A1 | 1/2019 | Ferguson et al. |
| 2019/0027034 A1 | 1/2019 | Xu et al. |
| 2019/0039545 A1 | 2/2019 | Kumar et al. |
| 2019/0042859 A1 | 2/2019 | Schubert et al. |
| 2019/0066399 A1 | 2/2019 | Jiang et al. |
| 2019/0096244 A1 | 3/2019 | Guruva Reddiar et al. |
| 2019/0101914 A1 | 4/2019 | Coleman et al. |
| 2019/0101919 A1 | 4/2019 | Kobilarov et al. |
| 2019/0106117 A1 | 4/2019 | Goldberg |
| 2019/0113919 A1 | 4/2019 | Englard et al. |
| 2019/0113929 A1 | 4/2019 | Mukadam et al. |
| 2019/0130878 A1 | 5/2019 | Bradley |
| 2019/0138007 A1 | 5/2019 | Baghsorkhi et al. |
| 2019/0138524 A1 | 5/2019 | Singh et al. |
| 2019/0147610 A1 | 5/2019 | Frossard et al. |
| 2019/0163176 A1 | 5/2019 | Wang et al. |
| 2019/0180529 A1 | 6/2019 | Smith |
| 2019/0188493 A1 | 6/2019 | Tiziani |

(56) References Cited

U.S. PATENT DOCUMENTS

| | | |
|---|---|---|
| 2019/0196465 A1 | 6/2019 | Hummelshøj |
| 2019/0220011 A1 | 7/2019 | Della Penna |
| 2019/0227553 A1 | 7/2019 | Kentley-Klay et al. |
| 2019/0235516 A1 | 8/2019 | Zhang et al. |
| 2019/0236950 A1 | 8/2019 | Li et al. |
| 2019/0256096 A1 | 8/2019 | Graf et al. |
| 2019/0258246 A1 | 8/2019 | Liu et al. |
| 2019/0258251 A1 | 8/2019 | Ditty et al. |
| 2019/0265059 A1 | 8/2019 | Warnick et al. |
| 2019/0271554 A1 | 9/2019 | Colgate et al. |
| 2019/0271981 A1 | 9/2019 | Oba |
| 2019/0329771 A1 | 10/2019 | Wray et al. |
| 2019/0331758 A1 | 10/2019 | Malkes et al. |
| 2019/0332106 A1 | 10/2019 | Belloni Mourao et al. |
| 2019/0337509 A1 | 11/2019 | Shalev-Shwartz et al. |
| 2020/0004241 A1 | 1/2020 | Levinson et al. |
| 2020/0017114 A1 | 1/2020 | Santoni et al. |
| 2020/0020226 A1 | 1/2020 | Stenneth et al. |
| 2020/0026286 A1 | 1/2020 | Vozar et al. |
| 2020/0057441 A1 | 2/2020 | Wang et al. |
| 2020/0086837 A1 | 3/2020 | Le Cornec |
| 2020/0094850 A1 | 3/2020 | Chi et al. |
| 2020/0097003 A1 | 3/2020 | Wray et al. |
| 2020/0098269 A1 | 3/2020 | Wray et al. |
| 2020/0110411 A1 | 4/2020 | Vozar et al. |
| 2020/0122830 A1 | 4/2020 | Anderson et al. |
| 2020/0124447 A1 | 4/2020 | Schwindt et al. |
| 2020/0139967 A1 | 5/2020 | Beller et al. |
| 2020/0150661 A1 | 5/2020 | Vozar et al. |
| 2020/0159227 A1 | 5/2020 | Cohen et al. |
| 2020/0189731 A1 | 6/2020 | Mistry et al. |
| 2020/0209846 A1 | 7/2020 | Chen |
| 2020/0209853 A1 | 7/2020 | Leach et al. |
| 2020/0209864 A1 | 7/2020 | Chen |
| 2020/0233060 A1 | 7/2020 | Lull et al. |
| 2020/0255027 A1 | 8/2020 | Kulkarni et al. |
| 2020/0269843 A1 | 8/2020 | Wissing et al. |
| 2020/0290619 A1 | 9/2020 | Mehdi et al. |
| 2020/0293038 A1 | 9/2020 | Laurent et al. |
| 2020/0293041 A1* | 9/2020 | Palanisamy .......... G05D 1/0221 |
| 2020/0294401 A1 | 9/2020 | Kerecsen |
| 2020/0298891 A1 | 9/2020 | Liang et al. |
| 2020/0309543 A1 | 10/2020 | Voznesensky |
| 2020/0310417 A1 | 10/2020 | Pedersen et al. |
| 2020/0339151 A1 | 10/2020 | Batts et al. |
| 2020/0346643 A1 | 11/2020 | Woon et al. |
| 2020/0346666 A1 | 11/2020 | Wray et al. |
| 2020/0355820 A1 | 11/2020 | Zeng et al. |
| 2020/0369294 A1 | 11/2020 | Jeon et al. |
| 2020/0379457 A1 | 12/2020 | Ostafew et al. |
| 2020/0400781 A1 | 12/2020 | Voorheis et al. |
| 2020/0401135 A1 | 12/2020 | Chen et al. |
| 2021/0018916 A1 | 1/2021 | Thakur et al. |
| 2021/0042535 A1 | 2/2021 | Abbott et al. |
| 2021/0046924 A1 | 2/2021 | Caldwell et al. |
| 2021/0110484 A1 | 4/2021 | Shalev-Shwartz et al. |
| 2021/0116907 A1 | 4/2021 | Altman |
| 2021/0132606 A1 | 5/2021 | Basich et al. |
| 2021/0163021 A1 | 6/2021 | Frazzoli et al. |
| 2021/0181758 A1 | 6/2021 | Das et al. |
| 2021/0188327 A1 | 6/2021 | Otliga |
| 2021/0197864 A1 | 7/2021 | Oltmann et al. |
| 2021/0200207 A1 | 7/2021 | Soryal et al. |
| 2021/0208244 A1 | 7/2021 | Voorheis et al. |
| 2021/0229697 A1 | 7/2021 | Lee et al. |
| 2021/0237759 A1 | 8/2021 | Wray et al. |
| 2021/0245785 A1 | 8/2021 | Suzuki et al. |
| 2021/0252715 A1 | 8/2021 | Javidan et al. |
| 2021/0269063 A1 | 9/2021 | Lee et al. |
| 2021/0286651 A1 | 9/2021 | Ho et al. |
| 2021/0300412 A1 | 9/2021 | Dingli et al. |
| 2021/0323573 A1 | 10/2021 | Gogna |
| 2021/0339741 A1 | 11/2021 | Rezvan Behbahani et al. |
| 2021/0365701 A1 | 11/2021 | Eshet et al. |
| 2021/0389769 A1 | 12/2021 | Hari et al. |
| 2021/0394757 A1 | 12/2021 | Beller et al. |
| 2022/0001892 A1 | 1/2022 | Fairley et al. |
| 2022/0032951 A1 | 2/2022 | Luo et al. |
| 2022/0063674 A1 | 3/2022 | De Francesco et al. |
| 2022/0066440 A1 | 3/2022 | Sucan et al. |
| 2022/0073097 A1 | 3/2022 | Sucan et al. |
| 2022/0076032 A1 | 3/2022 | Jain et al. |
| 2022/0081005 A1 | 3/2022 | Brown et al. |
| 2022/0114406 A1 | 4/2022 | Wyffels |
| 2022/0119006 A1 | 4/2022 | Ariyaratne et al. |
| 2022/0126878 A1 | 4/2022 | Moustafa et al. |
| 2022/0144306 A1 | 5/2022 | Narang et al. |
| 2022/0153263 A1 | 5/2022 | Hotta et al. |
| 2022/0161811 A1 | 5/2022 | Lu et al. |
| 2022/0169263 A1 | 6/2022 | Li et al. |
| 2022/0185325 A1 | 6/2022 | Chen et al. |
| 2022/0194419 A1 | 6/2022 | Houshmand et al. |
| 2022/0198107 A1 | 6/2022 | Pedersen |
| 2022/0204010 A1 | 6/2022 | Zhu et al. |
| 2022/0227389 A1 | 7/2022 | Tam |
| 2022/0230080 A1 | 7/2022 | Isele et al. |
| 2022/0315051 A1 | 10/2022 | Patel et al. |
| 2022/0317695 A1 | 10/2022 | Wang et al. |
| 2022/0348222 A1 | 11/2022 | Zhao et al. |
| 2022/0348223 A1 | 11/2022 | Zhao et al. |
| 2022/0388547 A1 | 12/2022 | Yangel et al. |
| 2023/0005163 A1 | 1/2023 | Kim |
| 2023/0067887 A1 | 3/2023 | Garg et al. |
| 2023/0131815 A1 | 4/2023 | Becattini et al. |
| 2023/0144745 A1 | 5/2023 | Ulutan et al. |
| 2023/0166764 A1 | 6/2023 | Johnson et al. |
| 2023/0174103 A1 | 6/2023 | Patel et al. |
| 2023/0176573 A1 | 6/2023 | Kumavat et al. |
| 2023/0192134 A1 | 6/2023 | Winter et al. |
| 2023/0194286 A1 | 6/2023 | Winter et al. |
| 2023/0256991 A1 | 8/2023 | Johnson et al. |
| 2024/0067208 A1 | 2/2024 | Shim et al. |

FOREIGN PATENT DOCUMENTS

| | | |
|---|---|---|
| JP | 2016091039 A | 5/2016 |
| JP | 2016184276 A | 10/2016 |
| WO | 2015160900 A1 | 10/2015 |
| WO | 2021231452 A1 | 11/2021 |

OTHER PUBLICATIONS

Cunningham, A., et al., "MPDM: Multipolicy Decision-Making in Dynamic, Uncertain Environments for Autonomous Driving", Proceedings of the IEEE International Conference on Robotics and Automation (ICRA) (2015).

Mehta, D., et al., "Autonomous Navigation in Dynamic Social Environments Using Multi-Policy Decision Making", Proceedings of the IEEE/RSJ International Conference on Intelligent Robots and Systems (IROS) (2016).

Mehta, D., et al., "Fast Discovery of Influential Outcomes For Risk-Aware MPDM", Proceedings go the IEEE International Conference on Robotics and Automation (ICRA) (2017).

Neumeier Stefan, et al., "Towards a Driver Support System for Teleoperated Driving", 2019 IEEE Intelligent Transportation Systems Conference (ITSC) (Year: 2019).

Paden, B., et al., "A Survey of Motion Planning and Control Techniques for Self-driving Urban Vehicles", IEEE Transactions on Intelligent Vehicles, vol. 1, Ids. 1, (Jun. 13, 2016).

Straub, J., "Comparing The Effect Of Pruning On A Best Path and a Naive-approach Blackboard Solver", International Journal of Automation and Computing (Oct. 2015).

Wuthishuwong, Chairit, et al., "Vehicle to Infrastructure based Safe Trajectory Planning for Autonomous Intersection Management", 2013 13th International Conference on ITS Telecommunications (ITST) (Year: 2013).

Crossman, Jacob, et al., "Method and System for Assessing and Mitigating Risks Encounterable by an Autonomous Vehicle", U.S. Appl. No. 18/538,312, filed Dec. 13, 2023.

* cited by examiner

METHOD AND SYSTEM FOR DYNAMICALLY CURATING AUTONOMOUS VEHICLE POLICIES

CROSS-REFERENCE TO RELATED APPLICATIONS

This application is a continuation of U.S. patent application Ser. No. 17/746,422, filed 17 May 2022, which is a continuation of U.S. patent application Ser. No. 17/738,462, filed 6 May 2022, which is a continuation of U.S. patent application Ser. No. 17/365,538, filed 1 Jul. 2021, which claims the benefit of U.S. Provisional Application No. 63/046,842, filed 1 Jul. 2020, each of which is incorporated in its entirety by this reference.

TECHNICAL FIELD

This invention relates generally to the autonomous vehicle field, and more specifically to a new and useful system and method for dynamically curating behavior policies for an autonomous agent in the autonomous vehicle field.

BACKGROUND

State of the art vehicle automation has enabled vehicles to operate effectively and safely in autonomous and/or semi-autonomous states. The inventors have enabled this through a multi-policy decision making process, which simulates a plurality of candidate policies for an autonomous agent at a future time point, thereby enabling an optimal policy to be selected based on the simulation results.

A technical problem that arises, however, is that there can be an abundance of potential policies that a vehicle can elect, which requires a large amount of computing resources to simulate and ultimately select the optimal policy (e.g., for safety, rider enjoyment, reaching a destination efficiently, etc.). These computing requirements can result in an inability to simulate all candidate policies, a requirement for much larger computing resources, an increased latency between policy election and execution, and/or other effects.

The inventors have discovered a new and useful system and method for dynamically curating these policies, which is described below.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
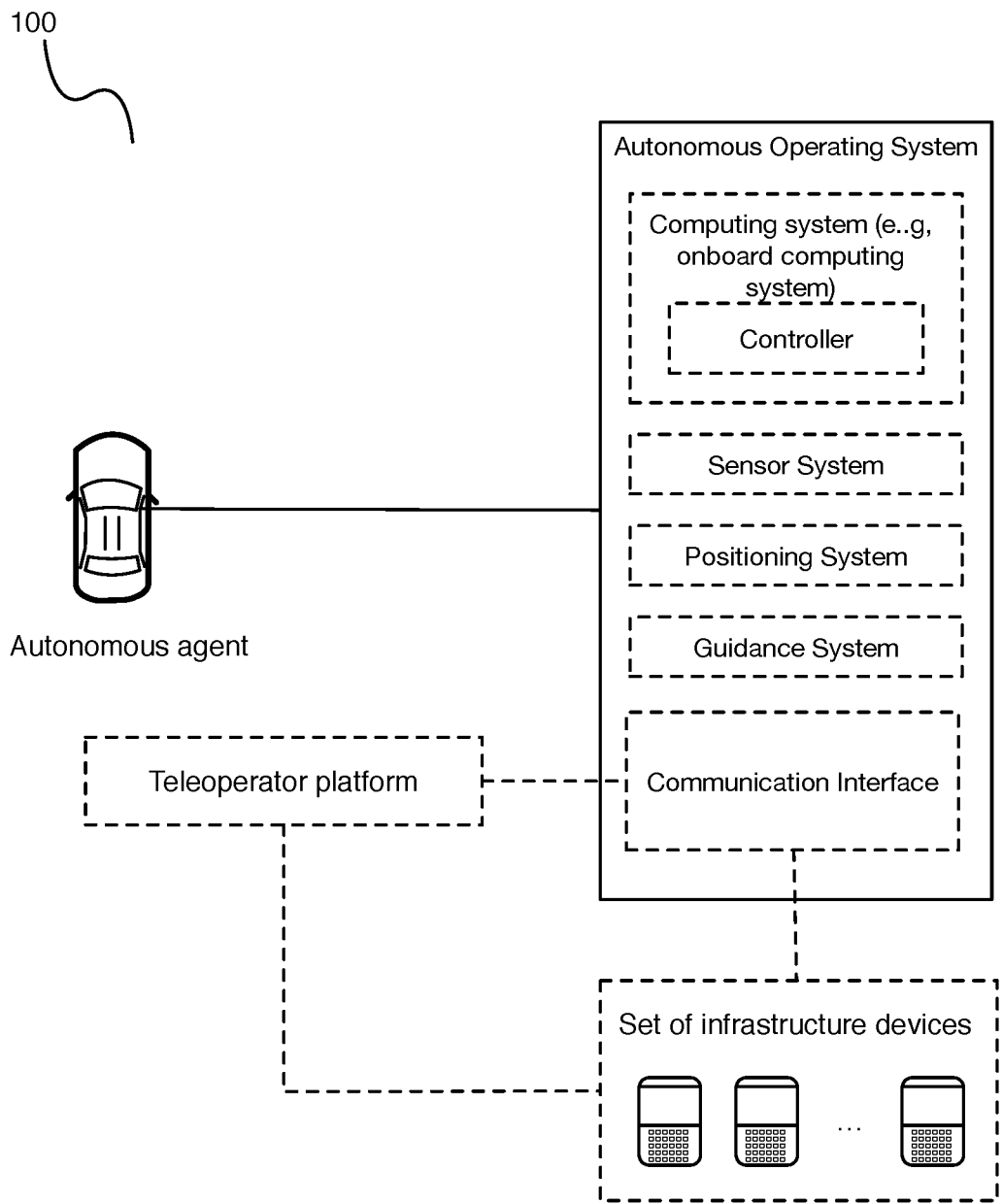
FIG. 1 is a schematic of a system for dynamic policy curation.

As shown in FIG. 1, a system 100 for dynamic policy curation includes a computing system and interfaces with an autonomous agent. The system 100 can further include and/or interface with any or all of: a set of infrastructure devices, a communication interface, a teleoperator platform, a sensor system, a positioning system, a guidance system, and/or any other suitable components. Additionally or alternatively, the system can include or all of the systems, components, embodiment, and examples as described in U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; and U.S. application Ser. No. 16/792,780, filed 17 Feb. 2020; each of which is incorporated in its entirety by this reference.

Figure 2:
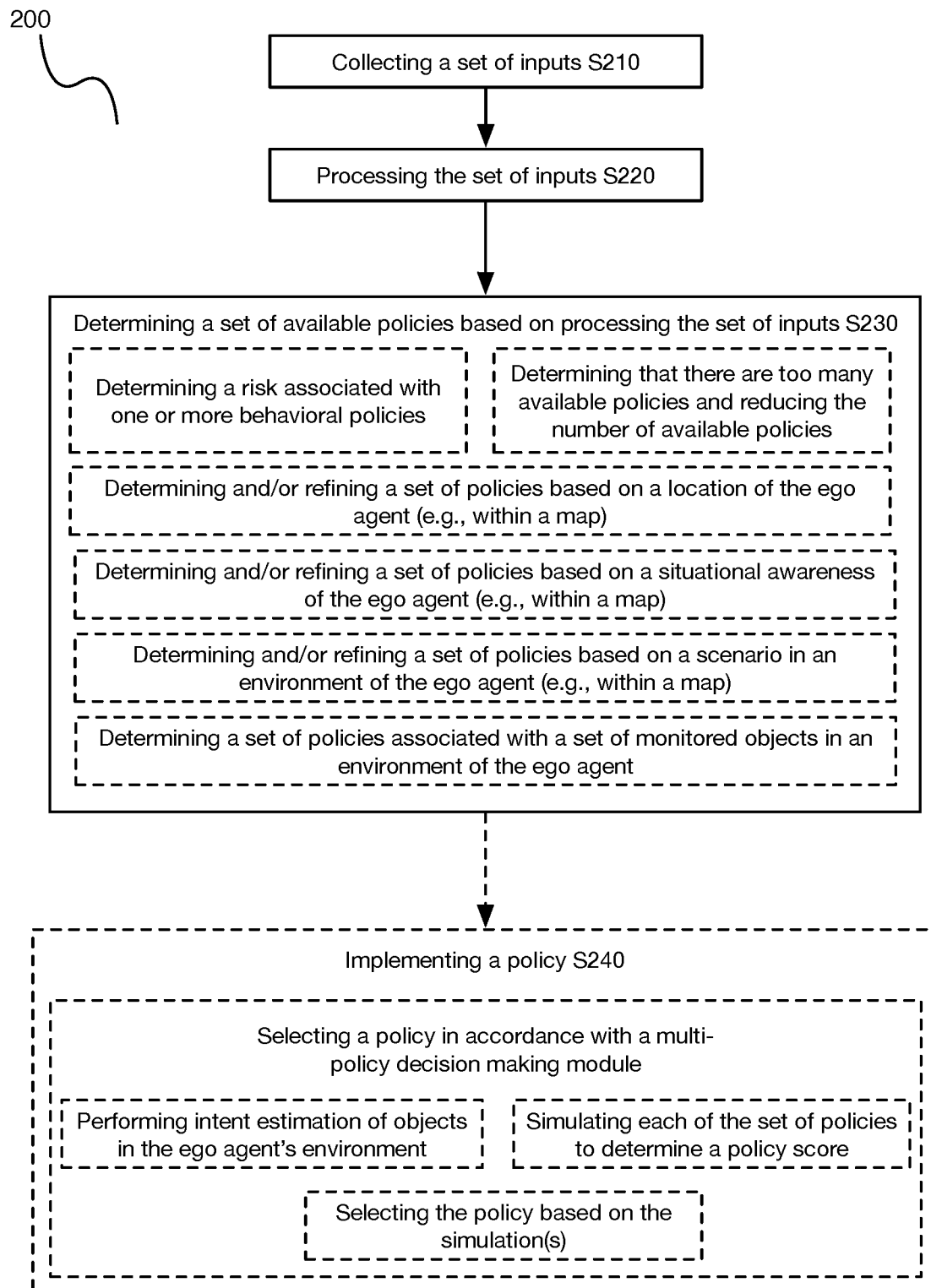
FIG. 2 is a schematic of a method for dynamic policy curation.
Figure 3:
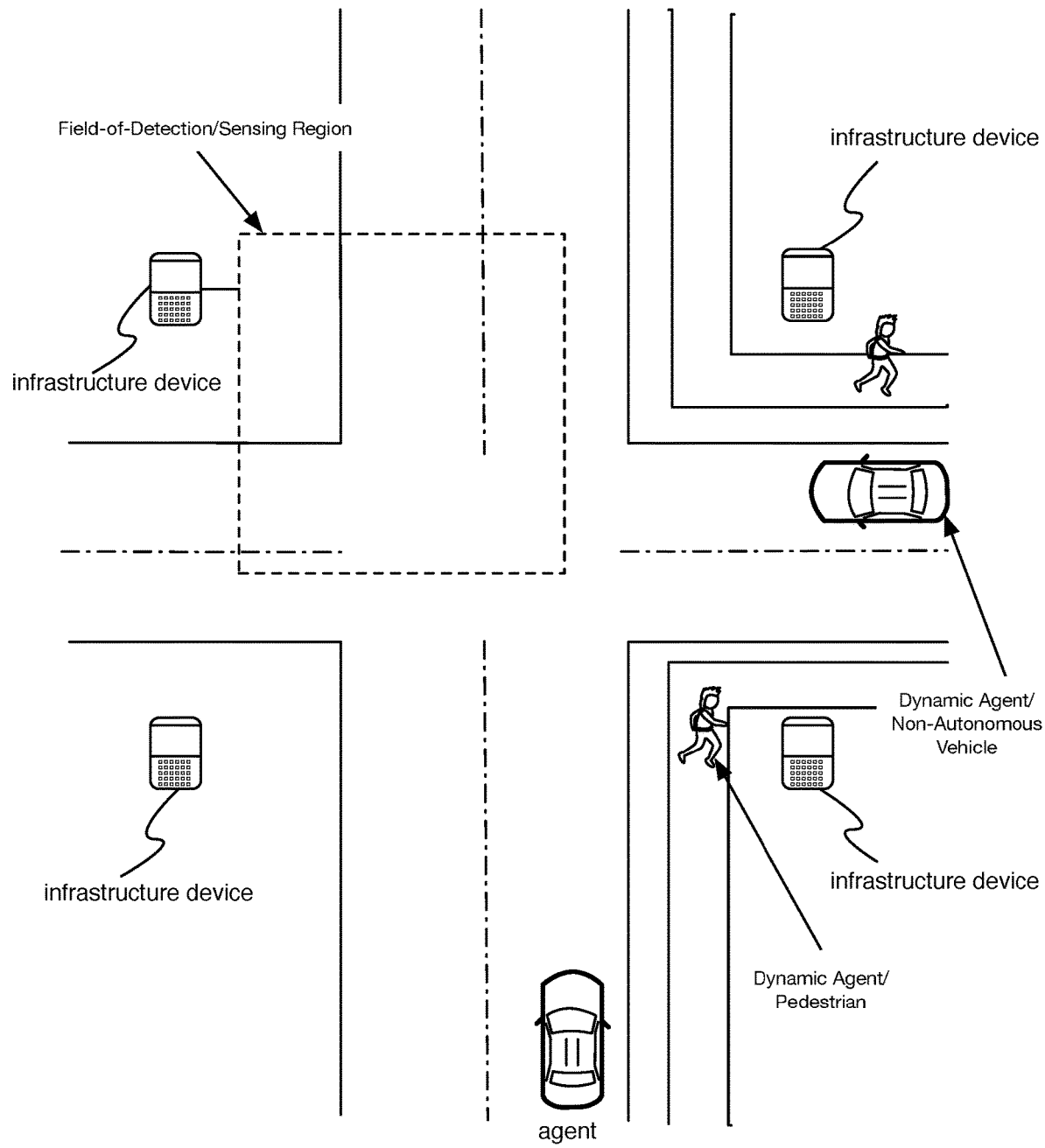
FIG. 3 depicts variations of the system and method implementing infrastructure devices defining field-of-detection sensing regions in which information is collected by the infrastructure devices and used in determining available policies.
Figure 4:
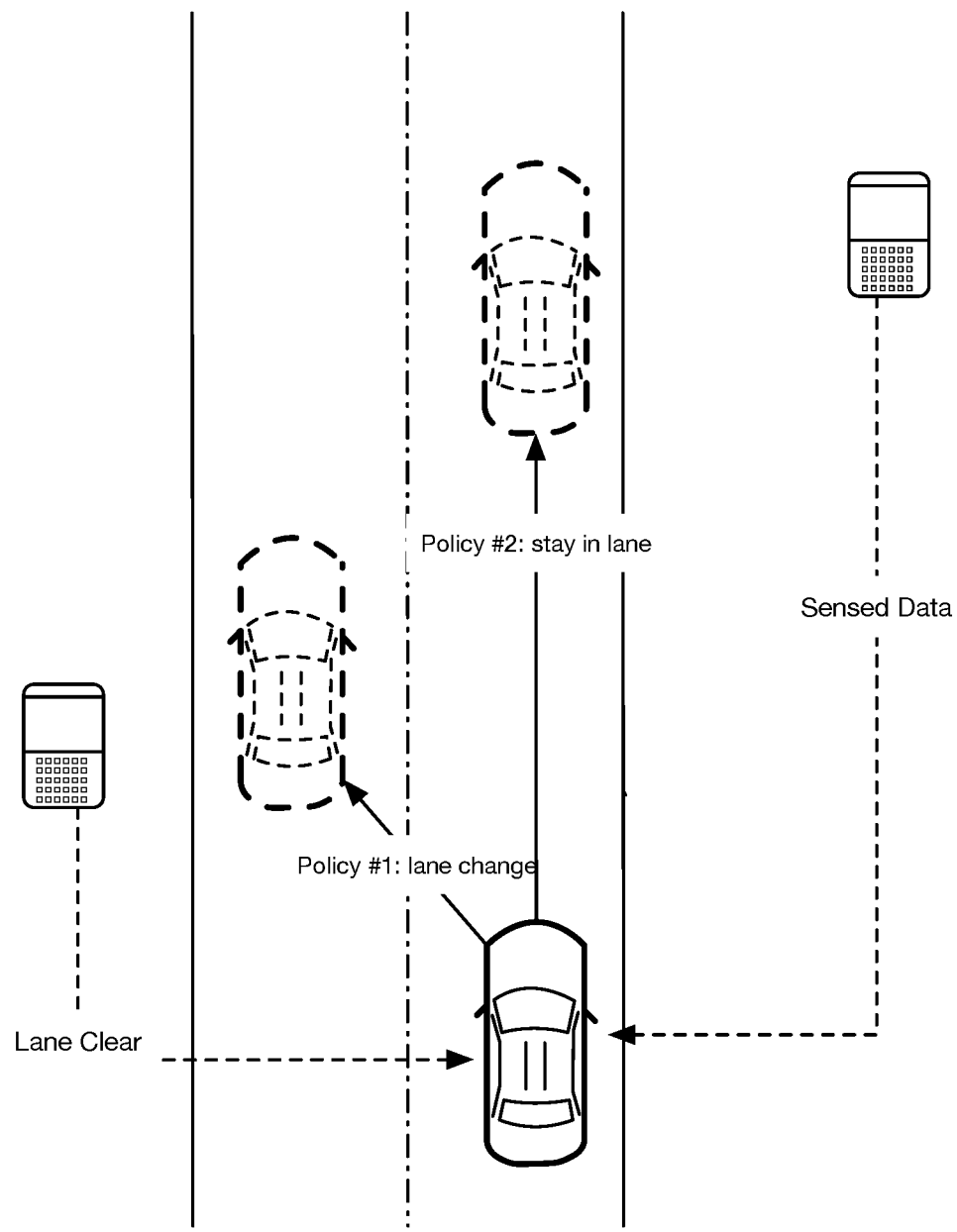
FIG. 4 depicts a set of example policies available to an autonomous agent, which are simulated in a multi-policy decision making process prior to electing an optional policy.

As shown in FIG. 2, a method 200 for dynamic policy curation includes collecting a set of inputs S210; processing the set of inputs S220; and determining a set of available policies based on processing the set of inputs S230. Additionally or alternatively, the method 200 can include any or all of: determining a risk associated with one or more policies; determining that there are too many available policies and reducing the number of available policies; implementing a policy S240; and/or any other suitable processes.

Further additionally or alternatively, the method can include or all of the methods, processes, embodiment, and examples as described in U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; and U.S. application Ser. No. 16/792,780, filed 17 Feb. 2020; each of which is incorporated in its entirety by this reference.

2. Benefits

The system and method for dynamically curating autonomous vehicle policies can confer several benefits over current systems and methods.

In a first variation, the system and/or method confers the benefit of reducing or minimizing the computing sources required to elect a policy (equivalently referred to herein as a behavioral policy) for an autonomous vehicle. This can further enable any or all of: a reduced latency in selecting and/or executing a policy; a minimization of the occurrence of implementing failed or less successful policies; and/or any suitable function. In specific examples, a number of policies available to an autonomous agent is dynamically and intelligently adjusted based on any number of conditions, which functions to prioritize the most important policies for the agent to consider and eliminate those of lower priority or predicted success.

In a second variation, additional or alternative to the first variation, the system and/or method confers the benefit of enabling many policies to be available generally to an autonomous agent, while prioritizing a subset for consideration at each election cycle. In specific examples, the set of policies available to the autonomous agent is vast, which is managed by dynamically curating a subset available to the vehicle based on any number of conditions and parameters.

In a third variation, additional or alternative to those described above, the system and/or method confers the benefit of leveraging input from a remote human operator (e.g., teleoperator) in certain instances of dynamic policy curation. In specific examples, a teleoperator input can be used for any or all of: adding and/or approving a policy for the agent to consider; removing a policy for the agent to consider; overriding a policy and/or the policy election process at an election step; and/or enabling any other suitable action.

In a fourth variation, additional or alternative to those described above, the system and/or method confers the benefit of leveraging information from a set of offboard sensing devices (equivalently referred to herein as roadside units and/or infrastructure devices) arranged in an environment of the autonomous agent, which can inform the selection of policies available to the agent.

Additionally or alternatively, the system and method can confer any other benefits.

3. System 100

The system 100 functions to curate and select the policies available to an autonomous agent as the environment of the vehicle dynamically changes. Additionally or alternatively, the system 100 can function to elect an optimal policy for the autonomous agent, execute the policy, and/or perform any other suitable function.

The system 100 includes a computing system and interfaces with an autonomous agent. The system 100 can further include and/or interface with any or all of: a plurality of infrastructure devices, a communication interface, a teleoperator platform, and/or any other suitable components.

The autonomous agent, equivalently referred to herein as an autonomous vehicle (e.g., a driverless car, a driverless shuttle, a driverless automotive-grade vehicle, etc.) and/or an ego agent, is preferably a fully autonomous vehicle, but can additionally or alternatively be any semi-autonomous or fully autonomous vehicle (e.g., a boat, an unmanned aerial vehicle, a driverless car, etc.). Further additionally, or alternatively, the autonomous agent can be a vehicle that switches between a semi-autonomous state and a fully autonomous state (or a fully-manned state) and thus, the autonomous agent can have attributes of both a semi-autonomous vehicle and a fully autonomous vehicle depending on the state of the autonomous agent. In addition or alternative to an autonomous vehicle, the autonomous agent can include any type of autonomous machine, autonomous device, autonomous robot, and/or any other suitable device.

The computing system functions to collect information involved in the dynamic curation of the vehicle's policies. Additionally or alternatively, the computing system can function to select the policy to be implemented, execute the policy, and/or can perform any other suitable functions.

A policy preferably refers to a behavior and/or action and/or operation associated with the agent. In specific examples, for instance, a policy can refer to a particular behavior of the agent, such as, but not limited to, any or all of: changing lanes, maintaining a lane (e.g., driving straight), merging, parking, turning (e.g., turning right, turning left, etc.), driving onto a shoulder, stopping, starting, braking, accelerating, and/or any other behaviors. Additionally or alternatively, a policy can refer to a behavior and/or action and/or operation associated with a particular set of parameters, such as a behavior with any or all of: a particular speed or set of speeds, a particular following distance relative to the vehicle ahead, a particular braking distance, a particular acceleration and/or deceleration, and/or any other parameters. In specific examples, for instance, a policy refers to a behavior along with a particular set of parameters associated with the behavior (e.g., driving straight with a predetermined speed, braking with a predetermined braking distance, braking with a predetermined deceleration, accelerating with a predetermined acceleration and/or speed(s), etc.). Additionally or alternatively, a policy can include and/or refer to any other information.

Additionally or alternatively, any other objects (e.g., other vehicles, pedestrians, animals, bicyclists, dynamic objects, static objects, etc.), which are equivalently referred to herein as monitored objects, in an environment of the ego agent can be associated with (e.g., assigned) one or more policies. In preferred variations, these policies along with the policy for the ego agent are used in an MPDM module (e.g., as described below), such as in intent estimation of these objects in a set of simulations. Additionally or alternatively, policies for monitored objects can be otherwise used.

The computing system preferably includes an onboard computing system arranged onboard (e.g., integrated within) the autonomous agent. Additionally or alternatively, the computing system can include any or all of: a remote computing system (e.g., cloud computing system, remote computing in communication with an onboard computing system, in place of an onboard computing system, etc.), a computing system integrated in a supplementary device (e.g., mobile device, user device, etc.), an edge device including mobile computing devices, and/or any other suitable computing systems and devices. In some variations, for instance, the autonomous agent is operable in communication with a remote or disparate computing system that may include a user device (e.g., a mobile phone, a laptop, etc.), a remote server, a cloud server, or any other suitable local and/or distributed computing system remote from the vehicle. The remote computing system can be connected to one or more systems of the autonomous agent through one or more data connections (e.g., channels), but can alternatively communicate with the vehicle system in any suitable manner.

The computing system preferably includes a processing system (e.g., graphical processing unit or GPU, central processing unit or CPU, or any suitable processing circuitry) and memory, but can additionally or alternatively include any other suitable components. The memory can be short term (e.g., volatile, non-volatile, random access memory or RAM, etc.) and/or long term (e.g., flash memory, hard disk, etc.) memory. In some variations, for instance, the onboard computing system operates to interact with and/or operably control any or one or more of the identified components or modules described herein. For instance, the onboard computing system can function to implement and/or execute computer instructions for implementing a multipolicy decisioning module, a synchronization module, and/or the like. In specific examples, the processing system and memory collectively function to dynamically manage the set of policies available to the autonomous agent (e.g., determined based on the method 200) in the framework of a multi-policy decision making framework, such as that described in U.S. application Ser. No. 16/514,624, filed 17 Jul. 2019, which is incorporated herein in its entirety by this reference. Additionally or alternatively, the processing system and memory, and/or any other suitable components, can be used for any other suitable functions.

The computing system (e.g., onboard computing system) preferably functions to control the autonomous agent and process sensed data from a sensor suite (e.g., a computer vision system, LIDAR, flash LIDAR, wheel speed sensors, GPS, etc.) of the autonomous agent and/or other sensors (e.g., from infrastructure devices) to determine states of the autonomous agent and/or states of agents in an operating environment of the autonomous agent. Based upon the states of the autonomous agent and/or agents in the operating environment and programmed instructions, the onboard computing system preferably modifies or controls behavior of autonomous agent, such as through the selection of a policy. Additionally, or alternatively, the computing system can include a multi-policy decision-making module that functions to generate policies and select a policy (e.g., change lanes, merge, maintain current lane, turn left, turn right, pull over, slow down, speed up, stop at light, stop at stop sign, yield, etc.) that the computing system can execute to control a behavior of the autonomous agent.

In a first set of variations, the computing system includes an onboard general-purpose computer adapted for I/O communication with vehicle control systems and sensor systems but may additionally or alternatively be any suitable computing device. The onboard computing system is preferably connected to the Internet via a wireless connection (e.g., via a cellular link or connection). Additionally, or alternatively, the onboard computing system can be coupled to any number of wireless or wired communication systems.

The system 100 preferably includes a communication interface in communication with the computing system, which functions to enable information to be received at (e.g., from infrastructure devices, from a remote computing system and/or remote server, from a teleoperator platform, from another autonomous agent or other vehicle, etc.) and transmitted from the computing system (e.g., to a remote computing system and/or remote server, to a teleoperator platform, to an infrastructure device, to another autonomous agent or other vehicle, etc.). The communication interface preferably includes a wireless communication system (e.g., Wi-Fi, Bluetooth, cellular 3G, cellular 4G, cellular 5G, multiple-input multiple-output or MIMO, one or more radios, or any other suitable wireless communication system or protocol), but can additionally or alternatively include any or all of: a wired communication system (e.g., modulated powerline data transfer, Ethernet, or any other suitable wired data communication system or protocol), a data transfer bus (e.g., CAN, FlexRay), and/or any other suitable components.

The system 100 can include a set of infrastructure devices, which function to observe one or more aspects and/or features of an environment and collect observation data relating to the one or more aspects and/or features of the environment. In preferred variations, the infrastructure devices additionally function to collect data associated with the observations and transmit the collected data and/or processed derivatives of the collected data to the autonomous agent. Additionally or alternatively, the infrastructure devices can function to collect and transmit data to a teleoperator platform, wherein the teleoperators can use the data to inform decision making of a teleoperator, such as whether to include and/or exclude a policy from consideration by the computing system of the autonomous agent. In a specific example, for instance, an infrastructure device enable a view around a corner of the vehicle to be seen, which a teleoperator can use to enable a turning policy to be considered by the autonomous agent (by seeing that the road is clear for a turn).

In a first set of variations, for instance, the infrastructure devices forward the collected observations data to an autonomous vehicle service and/or remote platform (e.g., implemented via a network of distributed computing systems) that operates to interactively communicate with and/or control one or more functions of the autonomous agent.

The infrastructure devices are equivalently referred to herein as roadside units, wherein roadside units preferably include devices in an immediate and/or close proximity or within short-range communication proximity to an operating position of an autonomous agent, and can function to collect data regarding circumstances surrounding the autonomous agent and in areas proximate to a zone of operation of the autonomous agent. In some embodiments, the roadside units include one or more of offboard sensing devices including flash LIDAR, thermal imaging devices (thermal cameras), still or video capturing devices (e.g., image cameras and/or video cameras, etc.), global positioning systems, radar systems, microwave systems, inertial measuring units (IMUs), and/or any other suitable sensing devices or combination of sensing devices.

The infrastructure devices can include computing capabilities via processing circuitry and a communication interface that enables the infrastructure devices to communicate with any or all of: a computing system of the autonomous agent, a remote computing system, a teleoperator platform, and/or any other suitable components or combination of components.

The zone of operation of the autonomous agent can optionally be defined as a predefined radius (e.g., 100 feet, between 50 feet and 100 feet, less than 50 feet, between 100 feet and 200 feet, greater than 200 feet, etc.) along a structured and/or unstructured route of the autonomous agent at any point along the structured route at which the autonomous agent no is positioned and/or operating (e.g., driving). In a specific example of a structured and/or predefined autonomous agent route, the proximate zone of operation of the autonomous agent is 100 feet from or along any point along the structured route.

A technical benefit achieved by the implementation of the infrastructure devices can include an ability to observe circumstances (e.g., around corners, down perpendicular streets, etc.) beyond the observable scope of the autonomous agent, which can subsequently function in the curation of one or more policies available to the agent. At a given instance in time, for example, observations of one or more aspects of a given environment may be made by an autonomous agent and observations of one or more different and/or overlapping aspects of the given environment may be made from a different perspective by one or more infrastructure devices arranged and operating in the given environment. In such embodiments, the perspective of the infrastructure devices, including the observation data therefrom, may be augmented to observation data from the perspective of the autonomous agent to generate a comprehensive perspective of the operating environment of the autonomous agent and/or to provide an additional view to one or more teleoperators of a teleoperator platform. This can enable improved predictions of the operating environment to be made and improved policy decisions to be selected and/or executed by the autonomous agent for operating independently (of an onboard human operator) and safely within the operating environment.

In some variations, the autonomous agent can augment and/or fuse data derived by an onboard sensor suite (e.g., as described below) with additional observations from the infrastructure devices (e.g., the roadside units) to improve policy curation and/or selection by the autonomous agent.

Additionally or alternatively, the infrastructure devices can detect and track any type or kind of agents in an operating environment, such as with a video camera or radar. In some variations, for instance, a video camera can function to provide detection of agents and semantic classification of the agent type and possible intent of an agent, such as a pedestrian that is about to cross a road, or a car that is about to make a left turn, a driver which is about to open a car door and exit their vehicle, a bicyclist operating in a bike lane, and/or any other suitable information.

Further additionally or alternatively, any or all of the infrastructure devices can include traffic management devices (e.g., traffic sensors, traffic lights, pedestrian lights, etc.) or the like operating in the environment that may function to communicate with any or all of: other infrastructure devices (e.g., roadside units); directly with the autonomous agent regarding any or all of: data collected and/or sensed by the infrastructure device, regarding an operating state of the infrastructure device (e.g., red or green traffic light), and/or any other information; directly with a teleoperator platform; and/or can communicate in any other suitable way. In a specific example, a traffic light can be an infrastructure device in an environment surrounding the autonomous vehicle that may function to communicate directly to the autonomous vehicle or to a roadside unit that may be in operable communication with the autonomous vehicle. In this example, the traffic light can function to share and/or communicate operating state information, such as a light color that the traffic light is projecting, or other information, such as a timing of the light changes by the traffic light, and/or the like.

In preferred variations, the communication interface enables the autonomous agent to communicate and/or exchange data with systems, networks, and/or devices external to the autonomous agent. This communication interface and/or a separate communication interface further preferably enables one or more infrastructure devices to communicate directly with the autonomous agent and/or with a remote computing system and/or with a teleoperator platform. The communication interface(s) preferably include one or more of a cellular system (or any suitable long-range communication system), direct short-wave radio, or any other suitable short-range communication system.

The system 100 preferably includes a sensor suite (e.g., computer vision system, LIDAR, RADAR, wheel speed sensors, GPS, cameras, etc.) including sensors onboard the autonomous vehicle, wherein the sensor suite is in communication with the onboard computing system and functions to collect information with which to dynamically curate the policies available to the autonomous agent. Additionally or alternatively, the sensor suite can function to enable the autonomous agent operations (such as autonomous driving), data capture regarding the circumstances surrounding the autonomous agent, data capture relating to operations of the autonomous agent, detecting maintenance needs (e.g., through engine diagnostic sensors, exterior pressure sensor strips, sensor health sensors, etc.) of the autonomous agent, detecting cleanliness standards of autonomous agent interiors (e.g., internal cameras, ammonia sensors, methane sensors, alcohol vapor sensors), and/or perform any other suitable functions.

The system can optionally include one or more controllers and/or control systems, which function to control autonomous operations and/or actions of the autonomous agent based on commands generated by one or more computing systems. Additionally or alternatively, one or more controllers can function to implement machine learning techniques to assist the functionality of the controller, such as feature detection/classification, obstruction mitigation, route traversal, mapping, sensor integration, ground-truth determination, and/or enable any other suitable functionalities. The controller can include any suitable software and/or hardware components (e.g., processor and computer-readable storage device) utilized for generating control signals for controlling the autonomous agent according to a routing goal of the autonomous agent and selected policies of the autonomous agent.

In some variations, the control system(s) include a dedicated arbiter of control signals that selectively passes one or more control signals to one or more lower-level driving mechanisms of the autonomous agent, such as any or the dedicated arbiters (e.g., arbiter circuit) described in U.S. application Ser. No. 16/540,836, filed 14 Aug. 2019, which is incorporated herein in its entirety by this reference. The arbiter can additionally or alternatively function to manage and/or implement policies, such as through the method described below.

Additionally or alternatively, the system can include any or all of: a sensor fusion system, a positioning system (e.g., including location sensors of the sensor system), a guidance system, and/or any suitable components. In some variations, for instance, the sensor fusion system synthesizes and processes sensor data and together with a multi-policy decisioning module predicts the presence, location, classification, and/or path of objects and features of the environment of the autonomous agent. In various embodiments, the sensor fusion system may function to incorporate data from multiple sensors and/or data sources, including but not limited to cameras, LIDARS, radars, infrastructure devices, remote data feeds (Internet-based data feeds), and/or any number of other types of sensors.

The positioning system processes sensor data along with other data to determine a position (e.g., a local position relative to a map, an exact position relative to lane of a road, vehicle heading, velocity, etc.) of the autonomous agent relative to the environment, which can function to determine what policies are available to the autonomous agent (e.g., as described below). The guidance system can process sensor data along with other data to determine a path for the vehicle to follow.

The system can optionally interface with a teleoperator platform, which refers to one or more remote teleoperators and associated components (e.g., communication interface with autonomous agent, computing system, output devices for displaying information from autonomous agents and/or infrastructure devices to teleoperators, input devices for receiving instructions/commands from teleoperators, etc.). The teleoperator platform can function to receive inputs from teleoperators, which can be used at least partially in the determination of the curated policies for the vehicle.

Additionally or alternatively, the system 100 can include any other suitable components.

4. Method 200

As shown in FIG. 2, a method 200 for dynamic policy curation includes collecting a set of inputs S210; processing the set of inputs S220; and determining a set of available policies based on processing the set of inputs S230. Additionally or alternatively, the method 200 can include any or all of: determining a risk associated with one or more policies; determining that there are too many available policies and reducing the number of available policies; implementing a policy S240; and/or any other suitable processes.

The method 200 functions to dynamically determine which policies are available to an autonomous agent, which subsequently enables any or all of: reducing computing resources required for selecting a policy; ensuring that the policy elected by the vehicle is best suited for the environment of the autonomous agent; the availability of a diverse and numerous set of general policies available to an autonomous agent; and/or perform any other suitable functions.

The method 200 is preferably performed continuously throughout operation of the autonomous agent, such as at every election step (e.g., every decision-making step) of the autonomous agent. Additionally or alternatively, the method 200 can be performed at a predetermined frequency; in response to a trigger (e.g., detection of a change in autonomous agent environment, detection of a transition in map regions of an autonomous agent, detection of a change in operating conditions of an autonomous agent, based on teleoperator input, etc.); at random intervals of time; and/or at any other suitable times.

In specific examples, the method 200 is performed according to an election cycle associated with a predetermined frequency (e.g., 4 times per second, 1 time per second, 2 times per second, 3 times per second, 5 times per second, between 1 and 5 times per second, between 1 and 10 times per second, between 10 and 50 times per second, greater than 50 times per second, etc.). Additionally or alternatively, the election cycle can be defined based on random intervals and/or otherwise defined. Further additionally or alternatively, the method 200 can be otherwise performed.

The method 200 is preferably performed by a system 100 as described above, but can additionally or alternatively be performed by any suitable system(s).

Performing the method 200 preferably includes implementing one or more rule-based processes, such as within the context of multi-policy decision making process, but can additionally or alternatively be otherwise implemented, such as through one or more machine learning processes including but not limited to deep learning processes (e.g., neural network, convolutional neural network, etc.) and/or any other suitable processes.

4.1 Method—Collecting a Set of Inputs S210

The method 200 includes collecting a set of inputs S210, which functions to to properly determine and/or prioritize what policies are available to the autonomous agent. Additionally or alternatively, S210 can function to select a policy, provide information to one or more entities for use in decision making (e.g., teleoperator platform), and/or perform any other suitable functions.

S210 is preferably performed initially in the method 200, and optionally multiple times during operation of the autonomous agent, such as any or all of: continuously, at a predetermined frequency (e.g., at each election cycle), at a predetermined set of intervals, at a random set of intervals, and/or at any other times. Additionally or alternatively, S210 can be performed in response to a trigger, once during the method 200, in response to another process of the method 200, in parallel with another process of the method 200, and/or at any other times.

In a preferred set of variations, for instance, a set of inputs is collected continuously throughout a vehicle trip (e.g., at each election step of an election cycle of the ego agent), but can additionally or alternatively be collected at any of the times described above.

The inputs are preferably collected from at least a sensor system of the autonomous agent (e.g., a location sensor of the vehicle, a set of cameras onboard the vehicle, a set of radar sensors onboard the vehicle, a set of lidar sensors onboard the vehicle, etc.), but can additionally or alternatively be collected from any or all of: sensor systems of infrastructure devices, a teleoperator platform, $3^{rd}$ party sensors, one or more databases (e.g., $3^{rd}$ party databases, weather databases, traffic databases, etc.), and/or from any other suitable sources.

In preferred variations, the inputs include a location of the vehicle (e.g., collected continuously), which is used to locate the vehicle within one or more maps described below and subsequently used to dynamically curate the policies of the agent based on the agent's location. The location of the vehicle is preferably in the form of positional coordinates (e.g., GPS coordinates), which is later referenced with one or more maps (e.g., as described below), but can additionally or alternatively include any other suitable location information. Additionally or alternatively, a vehicle's location can be determined based on other sensor information (e.g., camera information, other information (e.g., vertical characteristics of the road surface), and/or the vehicle's location can be determined in any other suitable way(s).

Additionally or alternatively, any other suitable sensor information can be collected, such as any or all of: motion information (e.g., agent velocity and/or speed, agent acceleration, etc.); orientation information (e.g., heading angle of agent, pose, etc.); temporal information (e.g., from a clock, to determine if the vehicle is driving in day vs. night, to determine if the vehicle is driving during rush hour, etc.); environmental information (e.g., from one or more cameras and/or radar sensors and/or lidar sensors); and/or any other suitable information.

One or more inputs related to the environmental conditions (e.g., lighting, rain, etc.) of the agent are further preferably collected (e.g., continuously), which define a situational awareness of the agent and can function to incorporate policies for consideration, eliminate policies from consideration, and/or otherwise curate and/or prioritize a set of policies available to the agent. In specific examples, for example, determining that a view of one or more sensors (e.g., optical sensors, cameras, radar sensors, lidar sensors, etc.) is being obstructed based on environmental conditions (e.g., due to glare, due to insufficient lighting conditions, due to a downpour of rain, due to covering by snow, based on an object obstructing its view, etc.) can be used to determine that some behavioral policies should be eliminated from consideration (e.g., a right turn if a right camera is obstructed), some policies should be added to consideration (e.g., a policy which eliminates the obstruction, a lane change to reduce glare, etc.), other inputs should be received (e.g., from a teleoperator), and/or these inputs can be otherwise used. These inputs (and any others described herein) can be collected from any or all of: the sensor system; $3^{rd}$ party tools (e.g., client applications), sites, and/or databases (e.g., online weather information, real-time traffic information, etc.); user input (e.g., aggregated user input, teleoperator input, onboard operator input, etc.); historical information; information collected at and/or any other suitable sources.

One or more inputs related to the surroundings of a vehicle can additionally or alternatively be collected, such as characteristics (e.g., location, speed, predicted characteristics, etc.) of monitored objects (e.g., as described above); the proximity of monitored objects (e.g., surrounding vehicles, nearby pedestrians, etc.) to the ego agent; potential obstacles to the ego agent; proximity of the ego agent to road landmarks (e.g., traffic lights, lane boundaries, etc.); inputs collected from infrastructure devices; and/or any other suitable inputs.

In some variations, for instance, inputs are collected which are used to determine one or more features associated with monitored objects (e.g., vehicles, pedestrians, other objects, etc.) in an environment of the ego agent. The features preferably include a location and a velocity associated with the monitored object, but can additionally or alternatively include any or all of: an orientation (e.g., heading, pose, etc.), acceleration, and/or any other features. The features can include any or all of: actual features, estimated features, predicted features (e.g., features of the monitored object in the future, etc.), and/or any other features. The inputs associated with monitored objects are preferably collected from a sensor system (e.g., cameras, radar sensors, lidar sensors, proximity sensors, etc.) of the ego agent, but can additionally or alternatively be collected with another sensor system (e.g., onboard an infrastructure device, onboard the monitored object itself, etc.), a database, received from the monitored object itself, and/or otherwise received from any other suitable sources.

In a set of specific examples, the features associated with the monitored objects are ultimately used in an MPDM module (e.g., as described below) in order to select an optimal policy for the ego agent (e.g., through intent estimation of the monitored objects in a set of simulations performed at the MPDM module).

One or more inputs related to a health of vehicle components can additionally or alternatively be collected, such as any or all of: information related to sensor health (e.g., of an autonomous agent, of an infrastructure device, etc.), such as from one or more health monitors described in U.S. application Ser. No. 16/505,372, filed 8 Jul. 2019, which is incorporated herein in its entirety by this reference; performance characteristics associated with components of autonomous agents (e.g., braking system, steering system, control system, etc.) and/or infrastructure devices; and/or any other suitable information.

In some variations (e.g., as described above), sensors of one or more infrastructure devices (e.g., roadside units) can be used to communicate information such as any or all of: knowledge of specific traffic light states; knowledge of agent state and agent surroundings or potential surroundings (e.g., view around a corner that an agent cannot detect from onboard sensors); and/or any other suitable information. As part of dynamically curating policies, in addition to dynamically curating policies, and/or alternative to dynamically curating policies, infrastructure devices can function to assess risk associated with a potential policy. This can function to enable a particular policy to remain in the curated set of policies, remove a policy from the curated set of policies, determine whether a teleoperator's input should be triggered, and/or perform any other suitable function(s). In a first set of specific examples, the infrastructure devices can function to add, keep, and/or remove one or more policies from the curated set for consideration by the ego agent (e.g., at the MPDM module). In one example, for instance, a policy which may have been eliminated from the set due to an obstructed view of a camera of the ego agent can remain for consideration in an event that a camera of the infrastructure device has a view of the obstructed region (e.g., indicating that there are no monitored objects in the obstructed region). In another example, for instance, a policy which may have been included in the set can be removed from consideration based on an infrastructure device detecting that there is a traffic jam or other delay (e.g., construction zone) in a region which the agent would encounter upon implementing that policy (e.g., turning right). Additionally or alternatively, the infrastructure devices can be otherwise used to inform any or all of the policies.

The inputs can optionally include one or more commands or other information from an onboard operator such as a safety driver, and/or a remote operator such as a teleoperator. This can include, for instance, a permission for the agent to consider and/or elect a policy that the agent cannot or would not elect itself, such as a high risk policy and/or otherwise rare policy. In specific examples, for instance, a teleoperator provides an input that the agent may pass a slow-moving vehicle ahead of it when the agent determines that it is safe to do so. The commands and/or permissions received from an operator are preferably still processed with other available policies in subsequent processes of the method and/or in a multi-policy decision-making module (e.g., simulated with other available policies) of the system, but can additionally or alternatively be selected in absence of further processing (e.g., in an override fashion).

In some variations, a teleoperator is alerted and his or her input requested in response to the detection of a particular scenario, such as with a classification module (e.g., as described below).

The set of inputs can additionally or alternatively include any or all of: inputs from one or more computing systems (e.g., as described above), historical information (e.g., learned fleet knowledge, aggregated information, etc.), information from one or more servers and/or databases (e.g., lookup tables), and/or any other suitable inputs.

In a first variation, S210 includes receiving a set of sensor inputs from a sensor system onboard the ego agent, wherein the set of sensor inputs includes at least location information associated with the ego agent, which can be used in subsequent processes of the method to determine a set of policies available to the agent (e.g., based on a map).

The set of inputs can additionally or alternatively be received from any other sensor systems (e.g., sensors of a set of infrastructure devices, sensors from other agents, etc.), information sources (e.g., databases, $3^{rd}$ party systems, etc.), a teleoperator, and/or any other information sources.

The set of inputs can further additionally or alternatively include any or all of: motion information associated with the ego agent, such as velocity information, acceleration information, and/or any other motion information; orientation information (e.g., heading, pose, etc.); sensor health information; historical information; and/or any other information.

The set of inputs can further additionally or alternatively include inputs with which to determine information (e.g., location information, orientation information, motion information, etc.) associated with one or more monitored objects in the environment of the ego agent. The inputs associated with the monitored objects are preferably at least partially collected at a sensor system onboard the ego agent, but can additionally or alternatively be received from an infrastructure device, sensors onboard the monitored object, and/or any other components.

In a specific example of the first variation, S210 includes collecting a set of sensor inputs from a set of sensors of the ego agent, the set of sensors include a set of cameras arranged onboard (e.g., mounted to an exterior of, mounted to an interior of, both, etc.) the ego agent and optionally any other sensors (e.g., location sensor, speedometer, accelerometer, inertial measurement unit, etc.) onboard the agent, wherein the sensor inputs are used to determine the set of policies associated with the ego agent in subsequent processes of the method.

Additionally or alternatively, S210 can include any other suitable processes.

4.2 Method: Processing the Set of Inputs S220

The method 200 includes processing the set of inputs S220, which functions to determine which policies are available to the agent. Additionally or alternatively, S220 can function to trigger the collection of further information (e.g., from a teleoperator) and/or can perform any other functions.

S220 is preferably performed in response to and based on S210, but can additionally or alternatively be performed in response to any other processes of the method 200, prior to any processes of the method 200, in parallel with any other processes of the method 200, and/or at any other suitable times. Further additionally or alternatively, S220 can be performed multiple times throughout operation of the ego agent (e.g., at a predetermined election cycle, in response to each iteration of S210, continuously, at a predetermined frequency, at random intervals, etc.), in response to a trigger, and/or at any other times.

S220 is preferably performed with an onboard computing and/or processing system of the agent (e.g., as described above), but can additionally or alternatively be performed with other suitable computing systems (e.g., a remote computing system), a teleoperator or onboard operator, and/or can be performed with any other suitable components.

S220 can include processing the set of inputs received in S210 to determine a set of features and/or parameters associated with any or all of: the ego agent, a set of monitored objects, a set of environmental conditions, and/or any other features and/or parameters. This can include, for instance, processing raw sensor data to determine (e.g., derive, calculate based on a set of equations and/or algorithms, determine with a set of models, etc.) any or all of the information (e.g., motion information, location information, etc.) described above and/or any other features or parameters. The inputs can be processed with any or all of: a set of equations (e.g., dynamic equations), algorithms, rules, models, lookup tables and/or databases, and/or any other tools.

S220 preferably includes processing the set of inputs (and/or features or parameters determined based on the set of inputs) with a set of rules, wherein the set of rules prescribes which policies are available to the agent and/or which policies are unavailable to the agent. The rules can include any or all of: a set of mappings (e.g., used in accordance with a set of lookup tables and/or databases), decision trees, equations, and/or any other components. Additionally or alternatively, inputs can be processed with a set of models (e.g., deep learning models, machine learning models, trained models, etc.), algorithms, and/or any other tools.

In a preferred set of variations, processing the set of inputs and/or features or parameters with a set of rules includes comparing a location of the ego agent with a set of one or more maps, wherein the maps prescribe which policies are available to an agent depending on its location. These policies available to the agent can be further refined (e.g., reduced, expanded, etc.) based on other inputs or information described below (e.g., teleoperator permission; situational information such as time of day and/or agent surroundings and/or weather conditions, etc.; etc.), and/or otherwise further curated.

Additionally or alternatively, any other inputs (e.g., as described above) can be compared with the map, such as orientation information and/or any other information.

The map is preferably a hand-labeled map, wherein a set of policies are prescribed (e.g., at a lookup table corresponding to the map) for each of a set of regions in the map. The set of policies prescribed for the region can optionally be determined based on any or all of: a type of lane (e.g., inside lane, outside lane, leftmost lane of a 4-lane highway, rightmost lane of a 4-lane highway, left-middle lane of a 4-lane highway, right-middle lane of a 4-lane highway, etc.) in the region, lane markings (e.g., solid lane lines, dashed lane lines, yellow lane lines, white lane lines, etc.) associated with the lane(s) in the region, traffic indicators associated with the region (e.g., traffic light, traffic sign, stop sign, yield sign, etc.), traffic laws (e.g., speed limit) associated with the region, road features (e.g., road curvature, roundabout, etc.) associated with the region, zones associated with the region (e.g., school zone, hospital zone, residential zone, etc.), and/or any other features associated with the region.

Additionally or alternatively, any or all of the policies associated with the map can be dynamically determined (e.g., with a set of trained models).

Additionally or alternatively, the set of policies can be determined based on the behavior of other vehicles at that location and/or in similar situations (e.g., similar time of day, similar weather, etc.). In some variations, for instance, policies (e.g., behavior, parameters associated with a behavior, etc.) can be selected based on how other vehicles are currently driving in that region and/or based on how other vehicles have historically driven in that region.

Determining policies based on the map can optionally include implementing one or more geofencing processes, wherein dynamically adjusting available policies to the agent is performed in response to entering a region associated with a particular set of policies and based on the location of the vehicle. Additionally or alternatively, any other processes can be implemented to detect that the ego agent is located within a particular region. Further additionally or alternatively, a location can be determined for the ego agent at each election cycle, where the location is then compared with the map and used to determine a set of available policies.

The method can optionally include determining the set of maps and associated policy assignments, such as based on historical information, based on a set of trained models, based on a labeling process, and/or based on any other processes.

S220 can optionally include processing any or all of the set of inputs to determine a situational awareness (equivalently referred to herein as a situation and/or environmental awareness) associated with the ego agent, which can be used to refine (e.g., add more available policies, remove policies, switch policies, etc.) and/or otherwise determine the set of policies available to the ego agent and/or any other agents or objects (e.g., as described below). The situational awareness is preferably associated with (e.g., determined based on) sensor information, further preferably at least sensor information from sensors onboard the ego agent, but can additionally or alternatively be determined based on sensor information from infrastructure devices, sensor information collected at other agents, and/or any other sensor information. Additionally or alternatively, the situational awareness of the agent can be determined based on sensor health information, environmental information (e.g., weather information, time of day, etc.), and/or any other information.

In some variations, for instance, a situational awareness of the agent indicates a field of view of the agent, such as from any or all of: a set of cameras onboard the ego agent, a set of radar sensors onboard the ego agent, a set of lidar sensors onboard the ego agent, and/or any other sensors. Additionally or alternatively, the field of view of the ego agent can be determined based on (e.g., supplemented with) information collected from sensors (e.g., cameras) onboard a set of infrastructure devices and/or based on any other information. In a first set of specific examples, for instance, a situational awareness of the agent can indicate that the agent's field of view is obstructed (e.g., by another agent or object, by glare from the sun, by heavy rain, by lack of light, etc.), which can subsequently result in a refinement of the policies available to the agent (e.g., as described below).

In a second set of variations, additional or alternative to the first, a situational awareness of the agent can indicate based on sensor health information (e.g., sensor health status, sensor calibration status, sensor age, sensor operational status such as on/off status, etc.) associated with sensors of the ego agent that the data collected from one or more sensors cannot be trusted (e.g., sensor is malfunctioning, sensor had died, sensor is no longer calibrated, etc.), which can subsequently result in a refinement of the policies available to the agent (e.g., removal of policies which require that sensor to execute, removal of policies which would be dangerous to execute without that sensor, etc.).

In a third set of variations, additional or alternative to those described above, the situational awareness can be determined based on environmental information associated with an environment of the ego agent, which can include, for instance, any or all of: a time of day at which the ego agent is driving; features associated with (e.g., based on historical information, based on a weather database, etc.) the time of day (e.g., amount of light, brightness of surroundings, traffic level, etc.); weather conditions (e.g., rain, snow, sleet, fog, cloudy conditions, sunny conditions, etc.); traffic conditions (e.g., high traffic, low traffic, etc.); and/or any other information. Any or all of the environmental information can be dynamically determined (e.g., based on a dynamically updated lookup table, based on a dynamically updated database, $3^{rd}$ party website and/or sensors and/or database, based on sensor information, etc.), predetermined (e.g., based on a predetermined lookup table, dataset, and/or set of rules; etc.), and/or any combination.

Additionally or alternatively, a situational awareness of the ego agent can be otherwise determined based on any suitable information.

S220 can further optionally additionally or alternatively include processing the set of inputs to determine a scenario associated with the ego agent, which can be used to refine and/or otherwise determine the set of policies available to the ego agent and/or any other agents or objects (e.g., as described below). A scenario (equivalently referred to herein as a scene and/or context) herein refers to a particular assessment (e.g., classification, categorization, assignment, etc.) of the agent's environment, such as an identification of the particular surroundings of the agent. The scenario can indicate, for instance, that the agent is within and/or proximal to (e.g., within a predetermined distance threshold of, approaching within a predetermined time period, along a fixed route of the ego agent, etc.) a scene which may be difficult, non-standard, and/or somewhat risky for the ego agent to navigate. A scenario is preferably identified based on sensor information (e.g., from the ego agent, from other agents, from infrastructure devices, etc.), such as based on any or all of: an uncertainty metric associated with sensor information exceeding a predetermined threshold (e.g., at a perception module of the computing subsystem, at a prediction module of the computing subsystem, etc.); an identification of one or more particular objects (e.g., construction equipment, large groups of pedestrians, unknown and/or rare objects such as a parade floats, large animals in a roadway, traffic barricades, flares, etc.) based on the sensor information; a scenario classification of the sensor information with a classifier; human input (e.g., identification by a teleoperator, identification by an onboard operator, etc.); and/or any other information. Specific examples of scenarios include, but are not limited to, any or all of: a construction zone (e.g., with construction vehicles driving backward), a large crowd of pedestrians (e.g., gathering in the road for a protest, crossing the road in large groups, etc.), pedestrians in the roadway outside of a crosswalk, unexpected lane closure, broken/unpowered traffic light, knocked down traffic sign, large animals in the roadway, objects (e.g., shopping carts, parade floats, etc.) in the roadway, and/or any other scenarios.

In a preferred set of variations, a scenario associated with the ego agent is determined with a classification module of the computing subsystem of the ego agent, wherein the classification module preferably includes one or more classifiers (e.g., perceptron classifier, Naïve Bayes classifier, decision tree classifier, logistic regression classifier, k-nearest neighbor classifier, neural network classifier, artificial neural network classifier, deep learning classifier, support vector machine classifier, etc.), further preferably one or more trained classifiers (e.g., machine learning classifier, deep learning classifier, etc.). Additionally or alternatively, the scenario can be determined with one or more untrained classifiers, models (e.g., machine learning model, deep learning model, etc.), algorithms, decision trees, and/or any other tools.

In a first set of examples, for instance, one or more streams of sensor information collected from at least a set of cameras onboard the ego agent is processed (e.g., at each election cycle, in response to a trigger, etc.) with a classification module (e.g., classifier, set of multiple classifiers, etc.) of the computing subsystem to detect if a scenario is present. In additional or alternative examples, information from one or more infrastructure devices can be used to classify a scenario (e.g., with a classification module). In specific examples, this can function to detect that a scenario is ahead of the ego agent (e.g., outside of the ego agent's current field of view, along a fixed route and/or currently planned route and/or potential route of the ego agent, etc.), which can function, for instance, to re-route the ego agent and/or otherwise refine the set of policies available to the ego agent and/or otherwise prompt any other processes (e.g., request of input from a teleoperator, selection of a particular policy associated with one or more objects in the environment of the ego agent, etc.).

Additionally or alternatively, the scenario can be determined based on situational information, any other inputs (e.g., as described in S210), and/or any other information.

Additionally or alternatively, S220 can include any other suitable processes.

4.3 Method: Determining a Set of Available Policies Based on Processing the Set of Inputs S230

The method 200 includes determining a set of available policies based on processing the set of inputs S230, which functions to determine and/or refine (e.g., iteratively refine) a subset of all policies which the autonomous agent should further consider (e.g., in a multi-policy decision making process) in electing a policy. S230 can additionally or alternatively function to minimize and/or reduce a number of policies to be considered by the vehicle, thereby minimizing computing resources and/or latency associated with computing; maximizing the number of simulations able to be performed for each policy at an MPDM module (e.g., thereby ensuring that the least risky and/or otherwise optimal policy is ultimately selected); and/or conferring any other benefits. Further additionally or alternatively, S230 can perform any other suitable functions.

S230 is preferably performed in response to and based on S220, and optionally multiple times during operation of the ego agent. Additionally or alternatively, S230 can be performed in response to another process of the method 200, prior to S240 and/or any other process(es) of the method 200, in parallel with and/or as part of any other process of the method 200, and/or at any other times.

S230 preferably includes referencing a set of one or more maps based on an agent location (e.g., dynamically determined with a sensor system described above) to determine at least a portion of the available policies. The maps preferably include a set of policy assignments corresponding to each of a set of regions defined in the set of maps. The regions are preferably defined by a set of boundaries (e.g., corresponding to geofenced boundaries, absent of geofenced boundaries, etc.), wherein the boundaries can optionally be defined based on one or more potential routes (e.g., predetermined routes, dynamically determined routes, etc.) driven by the agent (e.g., for ego agents operating as shuttles, for ego agents driving fixed delivery routes, etc.). The regions can be any or all of: independent (e.g., agent is only in one region at a time), overlapping (e.g., agent can be in multiple region at a time, wherein a region is determined for each policy and overlap when multiple policies are available, etc.), and/or any combination. Additionally or alternatively, the regions can be defined absent of a route of the ego agent (e.g., for ride sharing applications) and/or otherwise defined.

In a preferred set of variations, for instance, one or more regions are determined based on a lane in which the ego agent is driving and optionally the surrounding lanes. In some variations, each region includes a single lane along a road segment (e.g., including a portion of a route segment, including an entire route, etc.), wherein the available policies for that region take into account the particular lane and surrounding lanes. In specific examples, for instance, in an event that the region includes a right lane, a right turn and a left lane change are included in the available policies, wherein in a region including a left lane, a left turn and a right lane change are included in the available policies. Additionally, the region can include any number of road landmarks, such as stop lights, traffic signs (e.g., stop signs, yield signs, one-way signs, speed limit signs, etc.), road features (e.g., speed bumps, pot holes, highway shoulders, 1-way street, 2-way street, roundabout, etc.), wherein the available policies are further determined (e.g., assigned) based on these road landmarks. Additionally or alternatively, the region can take into account zoning information (e.g., school zone, hospital zone, residential zone, commercial zone, etc.) and/or any other information.

In some variations, a separate region is defined for each lane of a road segment (e.g., entire fixed route, portion of a fixed route, modular component of a dynamically determined route, etc.), wherein the policies assigned to each region are determined, at least partially, based on features and surroundings of that lane. In specific examples, a policy of veering into an adjacent lane is available in regions including any or all of: one-way streets, inner lanes of a multi-lane highway or 2-way street, into a left lane for right lane regions, into a right lane for left lane regions, and/or in any other suitable regions.

In variations including infrastructure devices, the map assignments can optionally additionally or alternatively be determined based on a proximity to an infrastructure device and/or the information collected by the infrastructure device, a state/health of the infrastructure device, and/or any other suitable information. In some examples, for instance, the set of policies available to ego agents at locations which are proximal to and/or viewable by a set of one or more infrastructure devices can potentially be greater than similar locations which are distant from and/or not viewable by infrastructure devices.

Additionally or alternatively, any or all of the boundaries can be determined based on predetermined boundaries (e.g., county lines, city-defined boundaries, etc.).

The boundaries in the map are preferably statically determined (e.g., during route planning), but can additionally or alternatively be dynamically determined.

The policy assignments can optionally take into account a set of one or more fixed routes planned for the agent (e.g., in implementations where the autonomous agent operates as an autonomous shuttle driving fixed routes). Additionally or alternatively, the autonomous agent can drive non-fixed routes (e.g., in autonomous ride-share embodiments, in autonomous taxi embodiments, etc.).

Additionally or alternatively, the policy assignments can be determined based on aggregated and/or historical data, such as data of which policies were executed by agents in the past and which were successful, failed, required onboard operator takeover, required teleoperator takeover, and/or any other suitable information.

Further additionally or alternatively, the policy assignments can be determined (e.g., selected, refined, etc.) based on the behavior of other agents at that location and/or similar locations (e.g., same lane type, same zone type, same speed limit, etc.), such that the policies available to the ego agent are similar to (e.g., mimic) the driving of other agents on the road. These other agents can refer to agents on the road with the ego agent (e.g., surrounding the ego agent), agents on the road prior to the ego agent (e.g., based on historical information aggregated from a set of agents, based on historical information collected at the ego agent, based on data collected at the same time of day and/or same situation, etc.), agents on similar roads as the ego agent, and/or any other agents. In some examples, for instance, policies are selected and/or designed (e.g., with a particular set of parameters such as speed limit and/or braking distance and/or acceleration, etc.) based on the behavior of other drivers at that location or a similar location.

Each region of the map can optionally include policy assignments that are any or all of: the same in number as other regions, below a predetermined threshold (e.g., based on computing resources, based on a latency requirement, etc.), above a predetermined threshold (e.g., including at least 1 policy, including at least 2 policies, etc.), have any suitable number of policies, and/or otherwise determined.

S230 can optionally further take into account one or more situational features (e.g., as described above) when determining the policies available to the agent. The situational features are preferably determined based on an agent's situational awareness, which can be enabled by any or all of the: the agent's sensor system, infrastructure device sensor systems, teleoperator input, onboard operator input, and/or any other suitable information. This can include an awareness, for instance, of any or all of: what other vehicles are surrounding the agent (e.g., whether they are blocking an agent's view from one or more sensors, how the surrounding vehicles are driving, etc.), environmental conditions surrounding the agent or predicted to be surrounding the agent (e.g., lighting conditions, weather conditions, traffic conditions, time of day, etc.), and/or any other suitable environmental features (e.g., as described above).

In some variations, for instance, a first set of available policies is determined based on the map and a location of the vehicle, wherein the available policies are further narrowed and/or expanded upon based on a situational awareness of the agent. In specific examples, a subset of the policies are eliminated for consideration (e.g., in this election cycle) based on poor environmental conditions (e.g., inclement weather, lack of sufficient light, etc.) and/or a set of policies are added to the set of available policies based on teleoperator input (e.g., electing a risky policy for consideration at a multi-policy decision making module of the agent) and/or infrastructure devices (e.g., seeing that the road is clear ahead of the ego agent has an obstructed view). Additionally or alternatively, policies can be added and/or removed based on any other information.

The policies associated with the situation are preferably determined based on a lookup table (e.g., database), but can additionally or alternatively be determined based on a model, algorithm, set of rules, decision tree, and/or any other tools. In variations in which a first set of available policies is determined based on a lookup table associated with a map, a lookup table associated with situational information can be any or all of: part of the map lookup table, separate and distinct from the map lookup table (e.g., and retrieved based on the map lookup table), and/or otherwise related or independent relative to the map lookup table. In a set of specific examples, for instance, a first set of policies is selected for the ego agent based on the ego agent's location in a map, wherein the first set of policies is reduced to a subset of the first set of policies (e.g., within the same lookup table, in a different lookup table, etc.) based on situational information which reduces a confidence of the ego agent's awareness of its environment. Additionally or alternatively, any or all of the policies can be determined with tools (e.g., models, equations, decision trees, etc.) other than a lookup table.

S230 can optionally additionally or alternatively include determining and/or refining the set of policies available to the ego agent based on a scenario associated with the ego agent. A particular scenario identified in an environment of the ego agent can, for instance, be used to add policies to the set (e.g., adding a policy which helps the ego agent navigate the scenario, adding a policy which the ego agent would only implement in that particular scenario, adding a policy which violates a traffic rule and/or traffic convention outside of that scenario, etc.), remove policies from the set, determine an altogether new set of policies, and/or otherwise determine policies available to the agent.

S230 can optionally additionally or alternatively receive any kinds of user input, which can be used to curate the policies available to the agent. In some variations, for instance, the agent can receive input from a teleoperator arranged remotely from the ego agent to determine any or all of the available policies. Additionally or alternatively, non-human input can be received, such as from an output of a deep learning model stored at a remote computing system.

In preferred variations, the user input is used to approve a policy for consideration by the ego agent (e.g., system asks the human for permission, high risk policy, etc.) by the ego agent, or, in other words, add a policy to the set of available policies. Additionally or alternatively, the user input can be used for any or all of: selecting a policy for the vehicle to elect, overriding a selected policy, eliminating a policy from consideration by the ego agent (e.g., based on an unusual condition), and/or can be used in any other suitable ways.

In some variations, for instance, a request for user input from a teleoperator is triggered in response to detecting a scenario (e.g., any scenario, a particular scenario, etc.) associated with the ego agent. In specific examples, the request for user input is in the form of a proposed policy which can only be considered by the ego agent with approval from a teleoperator. Additionally or alternatively, the request for user input can include sensor data (e.g., camera streams for teleoperator to view), a proposed policy for the teleoperator to eliminate for consideration (e.g., in an event that there are too many policies for the ego agent to consider), and/or any other request(s).

The available policies are preferably determined at least in part in S230 based on a predetermined set of policies assigned to (e.g., coded into) one or more maps (e.g., factoring in sensor values to account for situational awareness) and/or a lookup table referenced by the map. Additionally or alternatively, determining the policies include any or all of: evaluating a set of rules, evaluating a decision tree; weighting any or all of the set of inputs (e.g., based on a situational awareness, based on predetermined weights, based on dynamically determined weights, with an algorithm, etc.); implementing one or more algorithms or models, implementing one or more probabilistic and/or statistical methods (e.g., Bayesian methods); and/or the available policies can be determined with any other tools.

S230 can optionally include determining (e.g., referencing from a lookup table, calculating, etc.) a risk associated with one or more policies, which can function to reduce and/or prioritize the available policies. In some variations, for instance, a risk is calculated and/or referenced for policies, wherein policies having a risk above a predetermined threshold are eliminated from a set of available policies. Additionally or alternatively, if a risk is above a predetermined threshold, a teleoperator can be prompted to receive an input to enable a policy with a risk above a threshold.

S230 can optionally include determining that there are too many policies available to the agent (e.g., based on computing resources, based on a predetermined threshold, etc.) and/or the risk of one or more policies is too high, wherein one or more policies is subsequently removed from consideration. Policies can be eliminated based on any or all of: a calculated risk value, user input, historical data, a ranked list of policies, a random elimination process, a computing requirement associated with each policy, and/or based on any other features.

Further additionally or alternatively, any or all of the policy assignments can be determined based on one or more machine learning models, deep learning models, predictive algorithms, and/or any other suitable tools.

S230 can optionally include determining (e.g., predicting) a set of policies associated with any or all of a set of monitored objects in an environment of the ego agent. These policies can then be used, for instance, in running simulations associated with each of the set of available policies in accordance with an MPDM module (e.g., as described below). In specific examples, for instance, assigning a policy to each of a set of monitored objects in an environment of the ego agent (e.g., all objects perceivable by the ego agent, all objects within a predetermined distance threshold, etc.) can be part of an intent estimation process used in simulations of an MPDM module.

Additionally or alternatively, intent estimation can be performed in absence of assigned policies (e.g., only with position and/or velocity information associated with the monitored objects), the MPDM module can be implemented in another suitable way, the method can be performed in absence of an MPDM module, and/or the method can be otherwise suitably performed.

Additionally or alternatively, S230 can include any other suitable processes.

In a first variation, S230 includes referencing a set of maps based on a dynamically determined location of an agent, wherein the location specifies the region of the map in which the agent is located; determining a set of policies available to the agent based on the region, wherein the available policies can be any or all of: determined based on a rule-based approach, referenced from a lookup table, and/or otherwise determined; further curating the available policies based on a situational awareness of the agent (e.g., based on a sensor system of the agent, based on sensor systems of the infrastructure devices, based on teleoperator input, etc.); further curating the available policies based on the detection of a particular scenario in an environment of the ego agent; optionally, in an event that the number of policies is too large, reducing the number of available policies; and optionally receiving teleoperator input with respect to one or more available policies and/or a high risk policy not currently available to the agent, wherein the set of available policies can be further refined based on the teleoperator input.

Figure 5A:
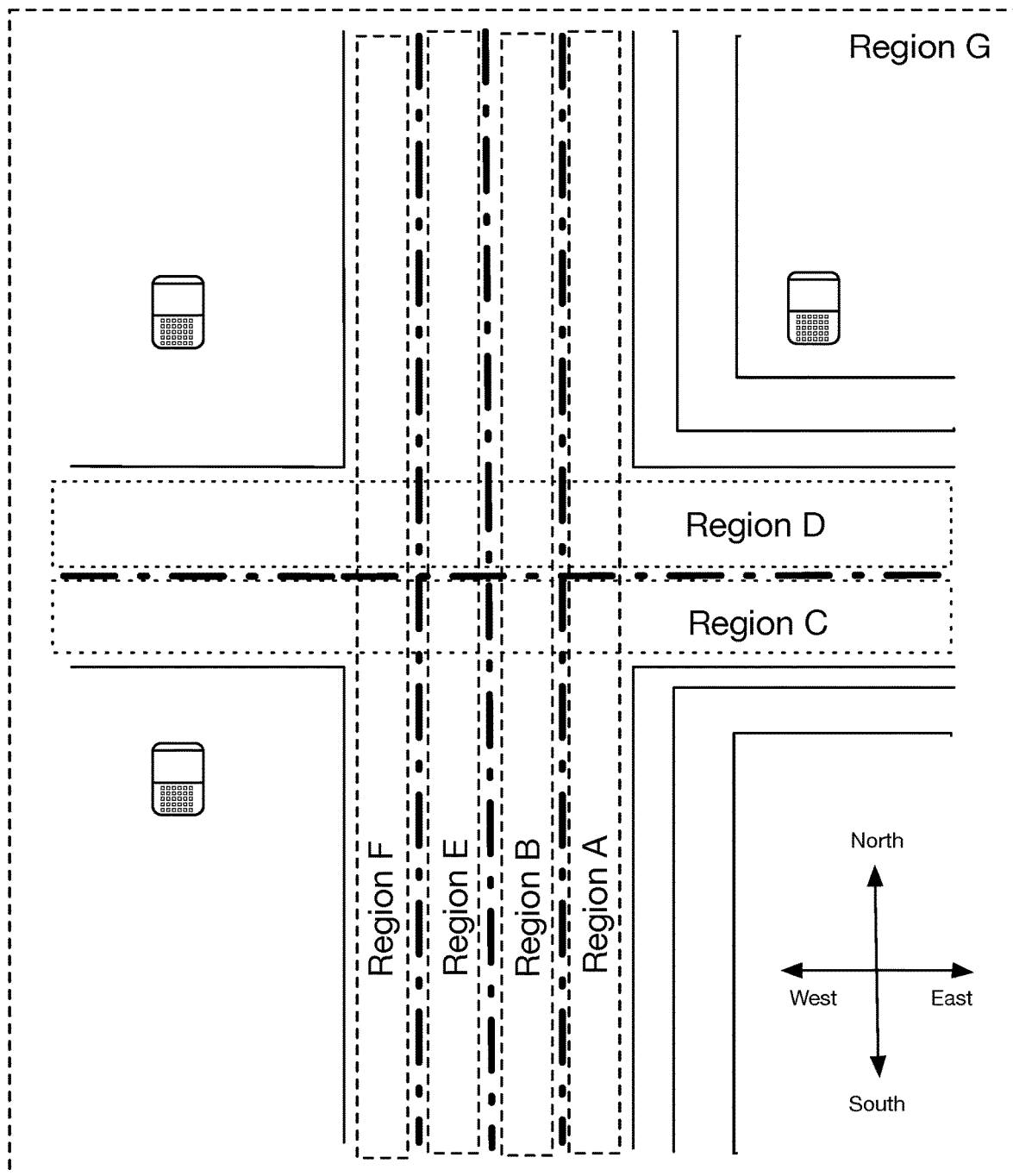
FIGS. 5A-5B depict an example map with options for different regions defined in the map, each region associated with a particular set of available policies and/or rules associated with determining the available policies.
Figure 5B:
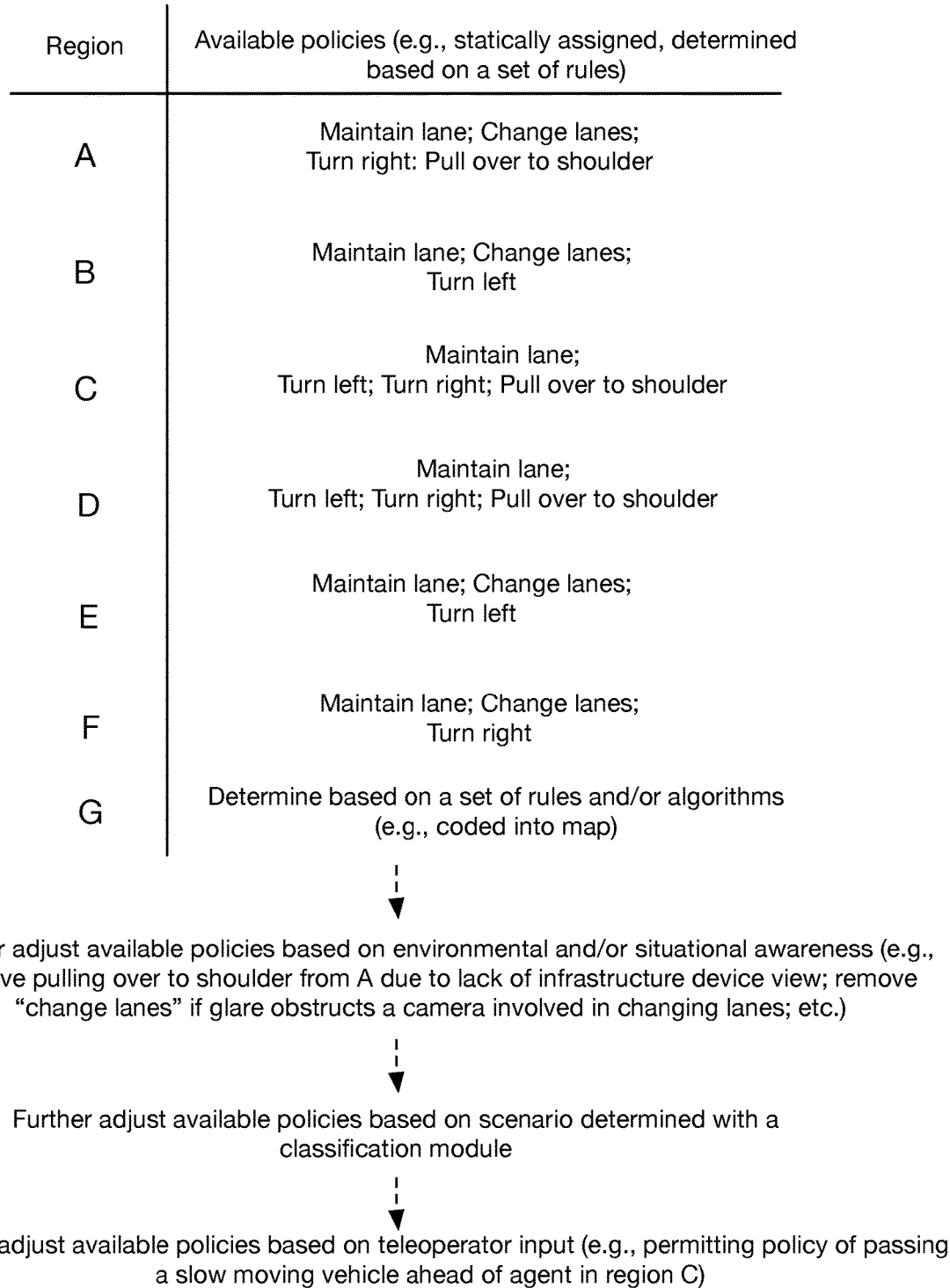

In specific examples (e.g., as shown in FIGS. 5A and 5B), the map can include any suitable regions or combination of regions, such as any or all of Regions A-G. The available policies for each region can be determined based on any or all of: referencing a lookup table (e.g., which statically assigns a set of policies based on the vehicle being located in the region; which dynamically assigns a set of policies based on a particular location of the vehicle within the region and a set of rules; which assigns a set of rules and/or algorithms; etc.); evaluating a set of rules and/or algorithms (e.g., based on the set of inputs including a location of the vehicle; a hard coding of policies for each region of the map; etc.); evaluating a set of models (e.g., deep learning models); determining and/or adjusting a set of available policies based on an environmental and/or situational awareness of the agent; prompting, determining, and/or updating policies based on teleoperator input; and/or determining available policies in any other suitable ways.

In additional or alternative specific examples, S230 can include assigning policies to any or all of a set of monitored objects in an environment of the ego agent. The policies assigned to these monitored objects are preferably determined based on position, velocity, and/or semantic (e.g., object classification) information associated with the monitored objects and determined based on sensor information collected from the ego agent and/or infrastructure devices.

In a second variation, additional or alternative to the first, S230 includes refining a set of policies associated with a location of the ego agent (e.g., assigned to a map) based on a situational awareness associated with the ego agent, wherein the situational awareness is preferably associated with the sensors of the ego agent and/or any other sensors associated with the system (e.g., sensors of an infrastructure device), but can additionally or alternatively be associated with one or more databases (e.g., $3^{rd}$ party databases) and/or any other information sources. In specific examples, a field of view associated with the cameras and/or radar and/or lidar sensors onboard the ego agent is used to determine whether or not there are any obstructions in the ego agent's view (e.g., another object blocking its view, weather conditions which decrease visibility, lighting conditions which decrease visibility, etc.), and if there are, to refine the policies (e.g., remove policies requiring this view) based on the obstructions. In additional or alternative specific examples, a time of day and/or other information (e.g., from traffic databases, from weather databases, etc.) can be used to refine the policies (e.g., remove policies which are risky if performed at night, remove policies associated with speeds above a predetermined threshold for times of day associated with high traffic, add policies associated with speeds below a predetermined threshold for times of day associated with high traffic, etc.).

Additionally or alternatively, the situational awareness can be used to determine policies in absence of a location of the agent and/or a map, the situational awareness can be used to retrieve a particular map associated with the situational awareness, the situational awareness can be determined based on any other information, the situational awareness can be used to determine a new set of policies (e.g., with respect to policies associated with a location and/or map), and/or the policies can be otherwise determined.

In a third variation, additional or alternative to those described above, S230 includes refining a set of policies based on a scenario detected (e.g., with a set of classifiers) in an environment of the ego agent. In some cases, for instance, a first set of policies can be determined based on a location of the ego agent in a map, wherein this first set of policies is then optionally refined based on a situational awareness associated with the ego agent, and then refined (e.g., again) based on the scenario. Additionally or alternatively, the policies can be refined in another order (e.g., based on scenario and then situational awareness, defined based on a situational awareness and then refined based on a location and then a scenario, etc.), determined in absence of any of this information (e.g., absent of a situational awareness, absent of a location, absent of a scenario, etc.), determined separately for each type of information (e.g., location vs. situational awareness vs. scenario) and then aggregated (e.g., to include only those policies in all sets) to determine the set of available policies, and/or the policies can be otherwise determined.

Figure 6A:
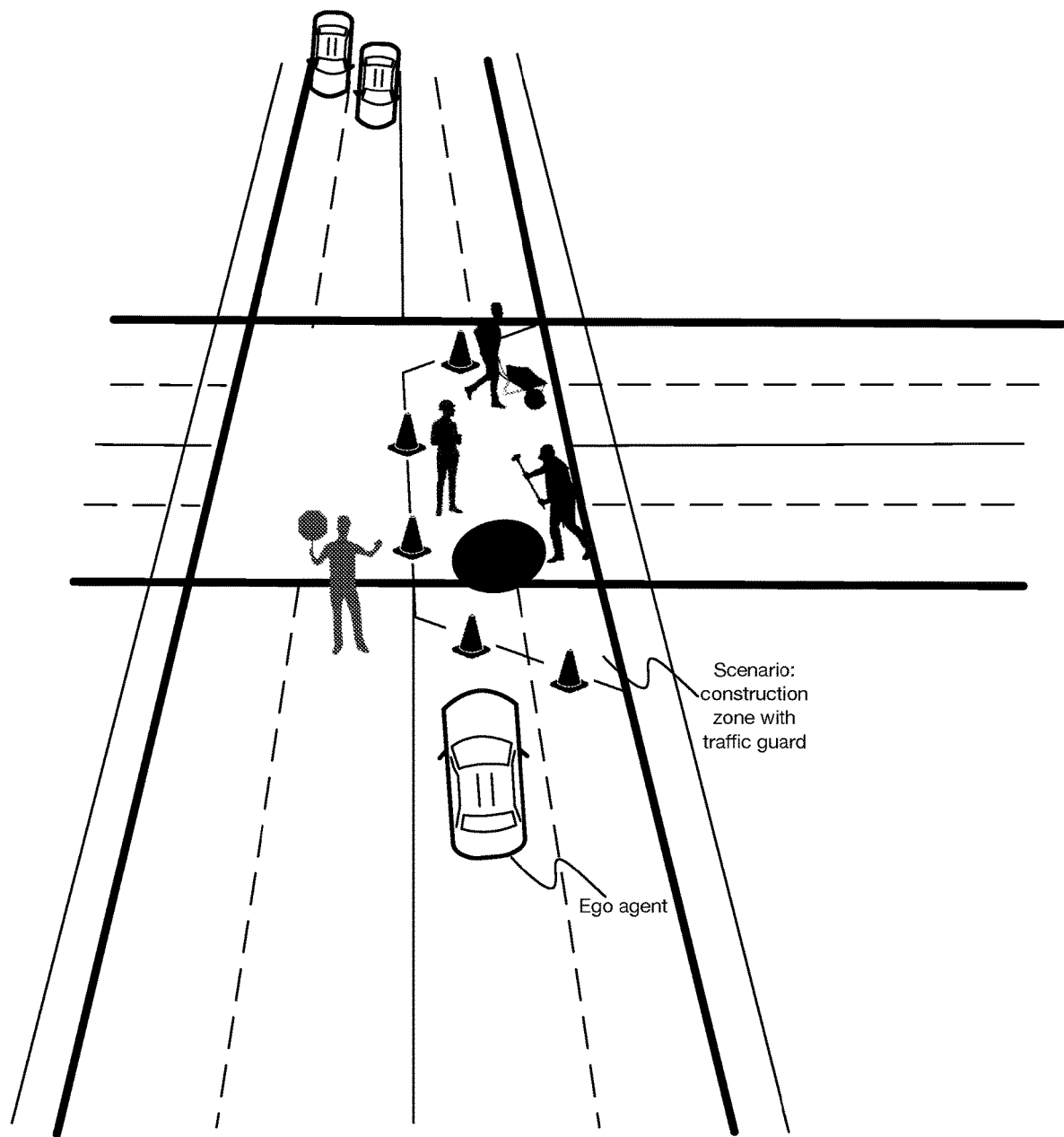
FIGS. 6A-6C depict a schematic variation of dynamic policy curation based on scenario determination and/or teleoperator input.
Figure 6B:
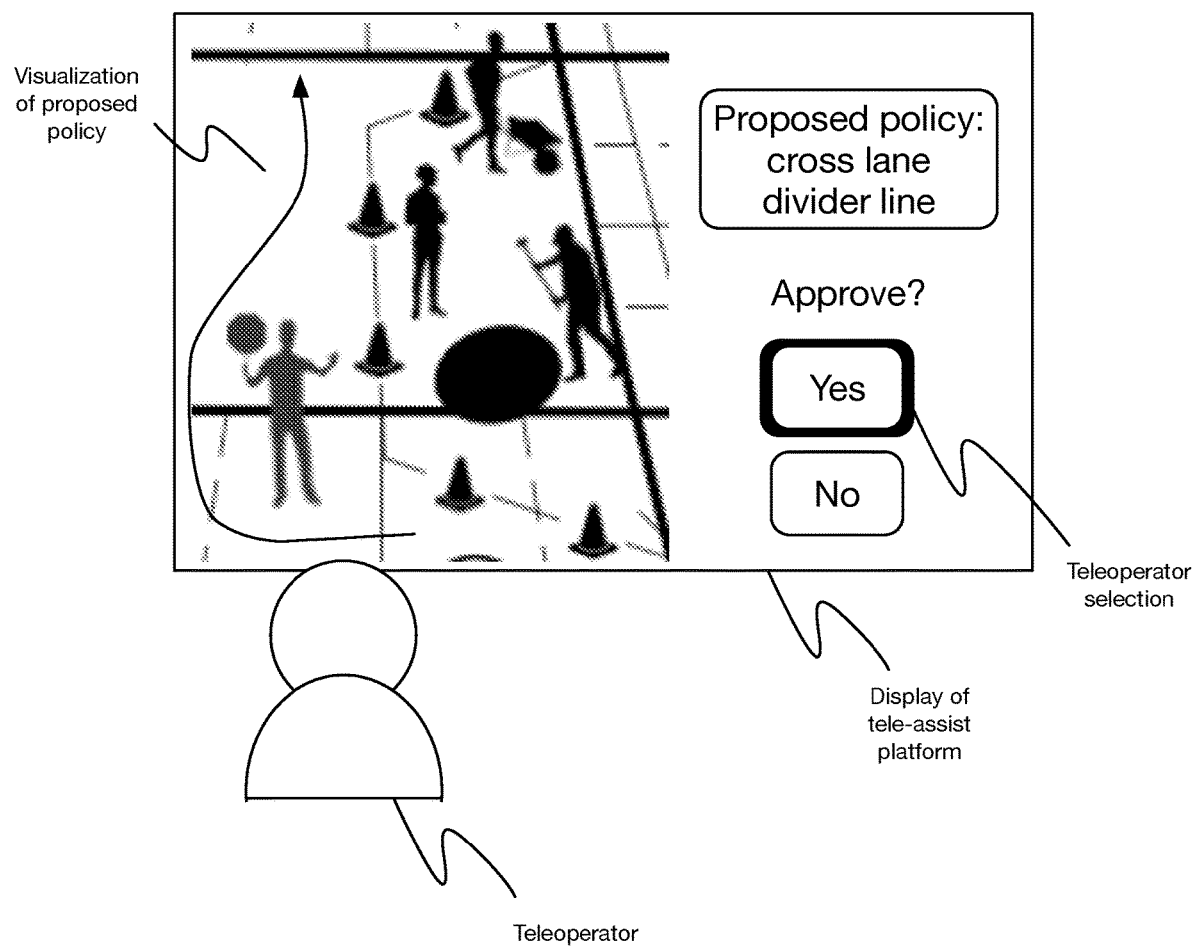
Figure 6C:
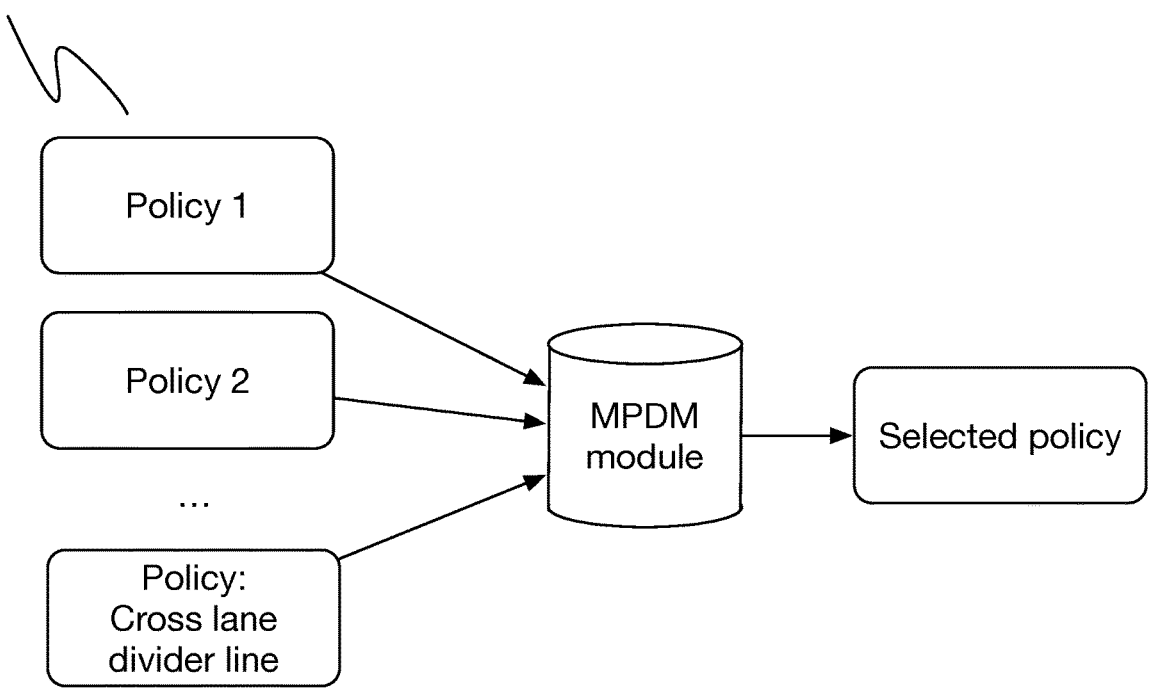

In a specific example of the third variation (e.g., as shown in FIGS. 6A-6C), a scenario of a construction zone is detected with a set of classifiers implemented at the computing subsystem and a set of sensor streams collected from sensors onboard the ego agent and/or from a set of infrastructure devices. A classifier, for instance, might detect irregular behavior of the construction equipment as monitored objects, such as vehicles backing up in the roadway, vehicles traveling in directions not aligned with the lanes, vehicles oriented in a direction not aligned with a lane, people motioning, the presence of traffic cones, and/or any other signs associated with the scenario. Upon detecting the scenario, a teleoperator can be alerted and presented with a policy for the ego agent, which the teleoperator can approve and/or reject, wherein in an event that the teleoperator approves the policy, the policy is added to the set of policies available for consideration by the ego agent. Additionally or alternatively, the teleoperator can detect and/or classify the scenario, and/or otherwise provide feedback associated with one or more policies.

In another specific example, S230 can include determining and/or adjusting one or more policies assigned to monitored objects associated with the scenario which can be used, for instance, in an MPDM module (e.g., as described below). In the case of a construction zone scenario, for instance, a construction vehicle can be assigned a policy which prescribes any or all of: more space for its movements (e.g., wider turns), a larger distance associated with backing up, a lower velocity for its movements, and/or any other policies.

In another specific example, a scenario is detected (e.g., with a set of classifiers) which indicates that large groups of pedestrians are present in a wide crosswalk. As a result of this scenario, a policy can be added to the set of available policies (e.g., based on teleoperator input, absent of teleoperator input, etc.) which allows the ego agent to travel through smaller gaps of people than normally permitted (e.g., not requiring that the crosswalk be completely clear), which can function to prevent the ego agent from being stopped at the crosswalk for a significant period of time.

Additionally or alternatively, S230 can include any other processes and/or be otherwise suitably performed.

3.4 Method: Implementing a Policy S240

The method 200 can optionally include implementing a policy S240, which functions to prescribe that the autonomous agent implements a selected policy. S240 is preferably performed in response to and based on S230 and optionally multiple times during operation of the ego agent. Additionally or alternatively, S240 can be performed in response to any other processes of the method, prior to any other processes of the method, in parallel with and/or during any other processes of the method, and/or at any other times during the method 200. Further additionally or alternatively, the method 200 can be performed in absence of S240.

S240 preferably includes selecting a policy from the set of available policies determined in S230 with a multi-policy decision making (MPDM) module, wherein the MPDM module evaluates each of the set of available policies (e.g., through a set of simulations) to select a policy to be implemented by the ego agent (e.g., at a control system of the ego agent). The MPDM module preferably considers each of the set of available policies by simulating a set of one or more scenarios associated with each policy. Based on the simulations for each policy, a score or other metric can be determined for that policy, wherein the ultimate policy selected is selected based on its score/metric (e.g., greatest score for safety, lowest score for risk, etc.). Additionally or alternatively, the MPDM module can otherwise evaluate the set of available policies.

Further additionally or alternatively, the set of available policies can be evaluated with any or all of: a set of models (e.g., machine learning models, deep learning models, neural networks, etc.), algorithms, rule-based processes, decision trees, prioritized lists, other scores, and/or any other tools.

In variations involving simulations of the ego agent and monitored objects within its environment, the simulations are preferably performed based on an intent estimation process associated with the set of monitored objects, wherein the intent estimation process functions to predict an intent (e.g., current policy, future policy, set of parameters such as speed and/or position associated with the object currently and/or in the future, other hypothesis, etc.) associated with the monitored object. In some variations, for instance, the MPDM module includes inferring and/or identifying an intent of each of the agents surrounding the autonomous agent and/or surrounding the infrastructure devices to generate one or more potential intents for these agents. The intent of the ego agent in each simulation preferably corresponds to the available policy in the set of available policies corresponding to that simulation, wherein S240 includes performing a set of simulations for each policy in the available set of policies, but can additionally or alternatively be otherwise determined.

In specific examples, for instance, the MPDM module includes a simulator or similar machine or system that functions to estimate the effects of future (i.e., steps forward in time) behavioral policies (operations or actions) for each of the agents identified in an operating environment of the ego agent along with each of the set of available policies that can be executed by the autonomous agent. The simulations may provide, for instance, data relating to positions, motion information, and/or potential interactions (e.g., relative positions, relative velocities, relative accelerations, potential collisions, etc.) between the ego agent and monitored objects.

The simulations can additionally or alternatively include perturbing any or all of a set of inputs, such as perturbing predicted information (e.g., a set of intents and/or positions and/or motion and/or semantic class information) associated with the set of monitored objects, which functions to take into account different ways in which the monitored objects may be behaving, thereby enabling a policy to be selected for the ego agent which is safe in light of any of these circumstances. For instance, a policy may be selected for the ego agent based on the collective set of simulations having a minimum risk (e.g., average risk is a minimum compared to the simulations of other policies, maximum risk simulation is smaller than other policies' maximum risk, etc.). Additionally or alternatively, any other properties (e.g., safety, time to destination, efficiency, minimum disturbance to passengers onboard the ego agent, minimum disturbance to other vehicles on the road, etc.) can be optimized for.

Specific examples of simulations are described in U.S. application Ser. No. 16/514,624, filed 17 Jul. 2019, and U.S. application Ser. No. 15/923,577, filed 16 Mar. 2018, each of which is incorporated herein in its entirety by this reference.

A set of simulations is preferably performed for each policy of the set of available policies. The set of simulations can optionally include multiple simulations, wherein the multiple simulations preferably differ in which policies and/or intents are estimated for the set of monitored objects, but can additionally or alternatively differ in the predicted parameters (e.g., positions, speeds, etc.) associated with the set of monitored objects and/or differ in any other ways. In specific examples, each available policy is evaluated through the same number of simulations, but the policies can additionally or alternatively differ in the number of simulations performed for each, have the same amount of time to perform the simulations, have different amounts of time to perform the simulations and/or be otherwise evaluated. Each available policy in the set is preferably evaluated prior to selecting a policy. Additionally or alternatively, the policies can be evaluated in a prioritized fashion (e.g., in an event that the ego agent runs out of time to select a policy) and/or be otherwise evaluated.

Selecting one of the set of available policies preferably functions to select one of the potential policies based on one or more predetermined or dynamic selection criteria. The selection criteria can be based on any suitable policy selection factors that may be delineated in advance of operating the ego agent or dynamically based on one or more features relating to an operating environment or operating mode of the ego agent. For instance, the selection criteria may be predetermined and/or set such that the ego agent functions to select the policy with the highest probability of being executed safely. In another example, if an operating circumstance of the autonomous vehicle includes an emergency situation, the selection criteria may be dynamic and set such that the autonomous agent functions to select a behavioral policy from the tractable set of behavioral policies that requires a (weighted) balance between efficiency in operation and safety or the like. Additionally or alternatively, the policy can be otherwise suitably selected.

Additionally or alternatively, S240 can include and/or interface with any or all of the methods, processes, embodiments, and/or examples as described in any or all of: U.S. application Ser. No. 16/514,624, filed 17 Jul. 2019, and U.S. application Ser. No. 15/923,577, filed 16 Mar. 2018, each of which is incorporated herein in its entirety by this reference, and which can function to select an optimal policy based on a predictive simulation with each of the available policies.

In a first variation, S240 includes implementing a multi-policy decision making process to select and implement a policy from the set of available policies as described above.

Additionally or alternatively, S240 can be otherwise performed.

4. Variations

Figure 7:
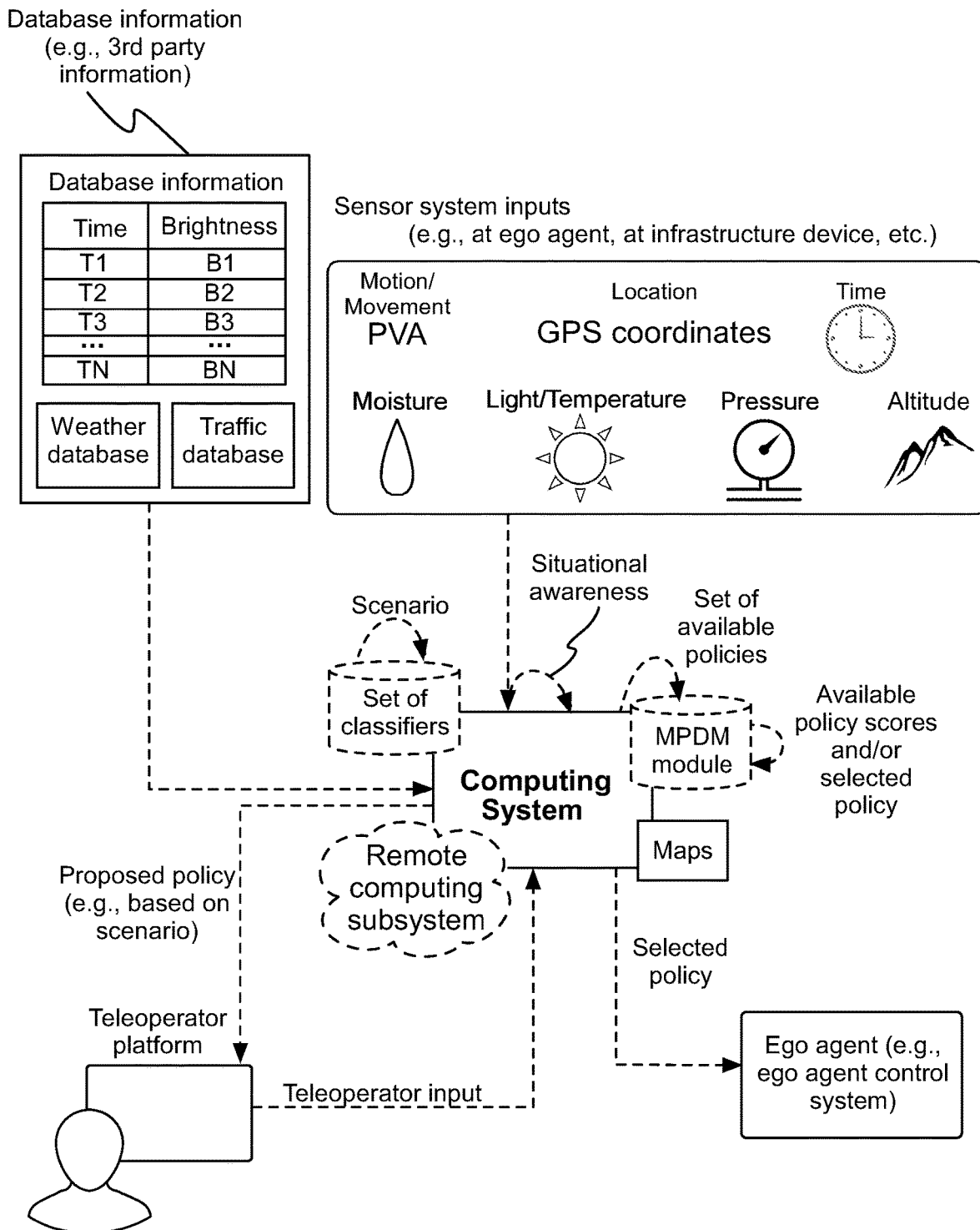
FIG. 7 depicts a schematic variation of a set of inputs and outputs involved in the method for dynamic policy curation.

In a first variation of the method 200 (e.g., as shown in FIG. 7), the method includes any or all of: collecting a set of inputs at a sensor system of the agent and optionally from any or all of roadside units or other infrastructure devices, a user (e.g., a teleoperator), and/or from any suitable sources; processing the set of inputs (e.g., to determine parameters associated with the inputs); referencing a set of maps based on a dynamically determined location of the agent, wherein the location specifies the region of the map in which the agent is located; determining a set of policies available to the agent based on the region, wherein the available policies can be any or all of: determined based on a rule-based approach, referenced from a lookup table, etc.; optionally further curating the available policies based on a situational awareness of the agent (e.g., based on a sensor system of the agent, based on sensor systems of the infrastructure devices, based on teleoperator input, etc.) and/or a detected scenario; optionally receiving teleoperator input with respect to one or more available policies and/or a high risk policy not currently available to the agent (e.g., based on a detected scenario); optionally reducing the number of available policies (e.g., in an event that the number of policies is too large); optionally processing each of the available policies with a multi-policy decision making module of the agent to select a policy from the set of available policies; and implementing the selected policy from the set of available policies (e.g., based on the multi-policy decision making module).

In a second variation of the method 200, additional or alternative to the first, the method includes any or all of: collecting a set of inputs at a sensor system of the agent and optionally from any or all of roadside units or other infrastructure devices, a user (e.g., a teleoperator), and/or from any suitable sources; processing the set of inputs (e.g., to determine parameters associated with the inputs); referencing a set of maps based on a dynamically determined location of the agent, wherein the location specifies the region of the map in which the agent is located; determining a set of policies available to the agent based on the region, wherein the available policies can be any or all of: determined based on a rule-based approach, referenced from a lookup table, determined with a model, and/or otherwise determined; determining a set of weights associated with the set of policies based on a situational awareness of the agent (e.g., based on a sensor system of the agent, based on sensor systems of the infrastructure devices, based on teleoperator input, etc.) and/or a detected scenario and/or teleoperator input; refining the set of policies based on the set of weights (e.g., eliminating policies associated with weights below a predetermined threshold, ordering the policies based on the weights, etc.); optionally reducing the number of available policies (e.g., in an event that the number of policies is too large); optionally processing each of the available policies with a multi-policy decision making module of the agent to select a policy from the set of available policies; and implementing the selected policy from the set of available policies (e.g., based on the multi-policy decision making module).

In a third variation of the method 200, additional or alternative to those described above, the method includes any or all of: collecting a set of inputs at a sensor system of the agent and optionally from any or all of roadside units or other infrastructure devices, a user (e.g., a teleoperator), and/or from any suitable sources; processing the set of inputs (e.g., to determine parameters associated with the inputs); referencing a set of maps based on a dynamically determined location of the agent, wherein the location specifies the region of the map in which the agent is located; determining a set of policies available to the agent based on the region, wherein the available policies can be any or all of: determined based on a rule-based approach, referenced from a lookup table, etc.; optionally further curating the available policies based on a situational awareness of the agent (e.g., based on a sensor system of the agent, based on sensor systems of the infrastructure devices, based on teleoperator input, etc.) and/or a detected scenario; optionally receiving teleoperator input with respect to one or more available policies and/or a high risk policy not currently available to the agent (e.g., based on a detected scenario); optionally reducing the number of available policies (e.g., in an event that the number of policies is too large); determining a set of predicted policies associated with any or all of the monitored objects in an environment of the ego agent; optionally processing each of the available policies along with the predicted policies of the monitored objects with a multi-policy decision making module to select a policy from the set of available policies for the ego agent; and implementing the selected policy from the set of available policies (e.g., based on the multi-policy decision making module).

Additionally or alternatively, the method 200 can include any other suitable processes performed in any suitable order.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A system for operation of an autonomous vehicle, the system comprising:
   a teleoperator interface configured to receive an input from a teleoperator;
   a computing subsystem onboard the autonomous vehicle, wherein the computing subsystem:

identifies a predetermined set of behavioral policies available for selection by the autonomous vehicle;
receives the input from the teleoperator;
determines a dynamic set of behavioral policies available for selection by the autonomous vehicle based on the input, wherein the dynamic set of behavioral policies comprises a behavioral policy not available for selection by the autonomous agent prior to receiving the input from the teleoperator;
evaluates each of an aggregated set of behavioral policies, the aggregated set of behavioral policies comprising the predetermined set of behavioral policies and the dynamic set of behavioral policies, to select a behavioral policy from the aggregated set for the autonomous vehicle to implement; and
a control subsystem, wherein the control subsystem maneuvers the autonomous vehicle according to the selected behavioral policy.

2. The system of claim 1, wherein the predetermined set of behavioral policies available for selection by the autonomous vehicle is identified based on at least one of: a position, a speed, or a heading of the autonomous vehicle.

3. The system of claim 2, wherein at least a portion of the predetermined set of behavioral policies is retrieved from a lookup table.

4. The system of claim 2, wherein the predetermined set of behavioral policies is identified absent of the input from the teleoperator.

5. The system of claim 1, wherein the selected behavioral policy is one of the predetermined set of behavioral policies.

6. The system of claim 1, wherein evaluating each of the aggregated set of behavioral policies comprises calculating a parameter value associated with each of the aggregated set of behavioral policies, wherein the selected behavioral policy is selected based on its parameter value.

7. The system of claim 6, wherein the parameter value is a score.

8. The system of claim 6, wherein the parameter value associated with each of the aggregated set of behavioral policies is determined based on the performance of a set of simulations.

9. The system of claim 1, wherein the input from the teleoperator comprises a type of policy, wherein the dynamic set of behavioral policies comprises the type of policy.

10. The system of claim 9, wherein the type of policy is not present in the predetermined set of behavioral policies.

11. A method for operation of an autonomous vehicle, the method comprising:
with a computing subsystem onboard the autonomous vehicle:
identifying a predetermined set of behavioral policies available to the autonomous vehicle;
receiving an input from a teleoperator interface in communication with the computing subsystem;
determining a dynamic set of behavioral policies available to the autonomous vehicle based on the input, wherein the dynamic set of behavioral policies comprises a behavioral policy not available to the autonomous vehicle prior to receiving the input from the teleoperator interface;
evaluating each of an aggregated set of behavioral policies, the aggregated set of behavioral policies comprising the predetermined set of behavioral policies and the dynamic set of behavioral policies, to select a behavioral policy from the aggregated set for the autonomous vehicle to implement; and
maneuvering the autonomous vehicle according to the selected behavioral policy.

12. The method of claim 11, wherein the predetermined set of behavioral policies available to the autonomous vehicle is identified based on at least one of: a position, a speed, or a heading of the autonomous vehicle.

13. The method of claim 12, wherein at least a portion of the predetermined set of behavioral policies is retrieved from a lookup table.

14. The method of claim 12, wherein the predetermined set of behavioral policies is identified absent of the input from the teleoperator interface.

15. The method of claim 14, wherein the selected behavioral policy is one of the predetermined set of behavioral policies.

16. The method of claim 11, wherein evaluating each of the aggregated set of behavioral policies comprises calculating a parameter value associated with each of the aggregated set of behavioral policies, wherein the selected behavioral policy is selected based on its parameter value.

17. The method of claim 16, wherein the parameter value is a score.

18. The method of claim 16, further comprising performing a set of simulations, wherein the parameter value associated with each of the aggregated set of behavioral policies is determined based on the set of simulations.

19. The method of claim 11, wherein the input from the teleoperator comprises a type of policy, wherein the dynamic set of behavioral policies comprises the type of policy.

20. The method of claim 19, wherein the type of policy is not present in the predetermined set of behavioral policies.

* * * * *